US012496584B2

(12) United States Patent
Bailey et al.

(10) Patent No.: US 12,496,584 B2
(45) Date of Patent: Dec. 16, 2025

(54) ASSAY DEVICE AND RECEIVING DEVICE

(71) Applicant: Premier Biotech, LLC, Minneapolis, MN (US)

(72) Inventors: Todd Bailey, Shorewood, MN (US); Liang Hong, Zhejiang (CN)

(73) Assignee: Premier Biotech, LLC, Minneapolis, MN (US)

( * ) Notice: Subject to any disclaimer, the term of this patent is extended or adjusted under 35 U.S.C. 154(b) by 13 days.

(21) Appl. No.: 16/939,586

(22) Filed: Jul. 27, 2020

(65) Prior Publication Data

US 2021/0031184 A1 Feb. 4, 2021

Related U.S. Application Data

(60) Provisional application No. 62/880,777, filed on Jul. 31, 2019.

(30) Foreign Application Priority Data

Jul. 31, 2019 (CN) ......................... 201910699245.0

(51) Int. Cl.
*B01L 3/00* (2006.01)
*B01L 3/02* (2006.01)

(52) U.S. Cl.
CPC ........... *B01L 3/5029* (2013.01); *B01L 3/0224* (2013.01); *B01L 3/5023* (2013.01); *B01L 3/5027* (2013.01);
(Continued)

(58) Field of Classification Search
CPC .... B01L 3/5029; B01L 3/0224; B01L 3/5023; B01L 3/5027; B01L 2200/027;
(Continued)

(56) References Cited

U.S. PATENT DOCUMENTS

| | | | |
|---|---|---|---|
| 4,857,453 | A | 8/1989 | Ullman et al. |
| 5,073,484 | A | 12/1991 | Swanson et al. |

(Continued)

FOREIGN PATENT DOCUMENTS

| | | |
|---|---|---|
| AU | 2006319681 | 6/2007 |
| CA | 2448721 | 12/2002 |

(Continued)

OTHER PUBLICATIONS

EESR of the corresponding EP Patent Application No. 20848263.8 dated Dec. 20, 2022.

*Primary Examiner* — Elizabeth A Robinson
*Assistant Examiner* — Sophia Y Lyle
(74) *Attorney, Agent, or Firm* — Nelson Mullins Riley & Scarborough LLP

(57) ABSTRACT

The present disclosure provides a device for testing an analyte in a fluid sample and a receiving device for treating the fluid sample, wherein the receiving device is used for receiving an absorbing element; the receiving device comprises a accommodating chamber and the chamber comprises a piercing element that is movable in the chamber, wherein the piercing element has a first position and a second position in the accommodating chamber, and configured to pierce the first sealed chamber; the accommodating chamber comprises a treatment solution for treating a fluid sample. The assay device and receiving device of the present disclosure treats a sample and quickly obtain the assay result, which is especially suitable for quick assay of a roadside drug.

10 Claims, 15 Drawing Sheets

(52) U.S. Cl.
CPC . *B01L 2200/027* (2013.01); *B01L 2200/0605* (2013.01); *B01L 2200/16* (2013.01); *B01L 2300/044* (2013.01); *B01L 2300/047* (2013.01); *B01L 2300/0825* (2013.01); *B01L 2300/0867* (2013.01); *B01L 2400/0406* (2013.01); *B01L 2400/0644* (2013.01)

(58) Field of Classification Search
CPC ..... B01L 2200/0605; B01L 2300/0825; B01L 2400/0406; B01L 2400/0644; B01L 2200/0621; B01L 2200/16; B01L 2300/044; B01L 2300/047; B01L 2300/0672; B01L 2300/087; B01L 2400/0478; B01L 2400/0683; B01L 2300/069; B01L 2300/0867; B01L 2400/0481; G01N 33/50
See application file for complete search history.

(56) References Cited

U.S. PATENT DOCUMENTS

| | | | |
|---|---|---|---|
| 5,119,831 | A | 6/1992 | Robin et al. |
| 5,185,127 | A | 2/1993 | Vonk |
| 5,275,785 | A | 1/1994 | May et al. |
| 5,352,410 | A | 10/1994 | Hansen et al. |
| 5,376,337 | A | 12/1994 | Seymour |
| 5,416,000 | A | 5/1995 | Allen et al. |
| 5,504,013 | A | 4/1996 | Senior |
| 5,576,009 | A | 11/1996 | Nastke et al. |
| 5,602,040 | A | 2/1997 | May et al. |
| 5,622,871 | A | 4/1997 | May et al. |
| 5,654,162 | A | 8/1997 | Guire et al. |
| 5,656,503 | A | 8/1997 | May et al. |
| 5,658,531 | A | 8/1997 | Cope et al. |
| 5,686,315 | A | 11/1997 | Pronovost et al. |
| 5,766,961 | A | 6/1998 | Pawlak et al. |
| 5,770,460 | A | 6/1998 | Pawlak et al. |
| 5,916,815 | A | 6/1999 | Lappe |
| 5,976,895 | A | 11/1999 | Cipkowski |
| 6,140,136 | A | 10/2000 | Lee |
| 6,187,269 | B1 | 2/2001 | Lancesseur et al. |
| 6,187,598 | B1 | 2/2001 | May et al. |
| 6,228,660 | B1 | 5/2001 | May et al. |
| 6,235,241 | B1 | 5/2001 | Catt et al. |
| 6,248,598 | B1 | 6/2001 | Bogema |
| 6,306,642 | B1 | 10/2001 | Nelson et al. |
| 6,352,862 | B1 | 3/2002 | Davis et al. |
| 6,372,515 | B1 | 4/2002 | Casterlin et al. |
| 6,379,620 | B1 | 4/2002 | Tydings et al. |
| 6,403,383 | B1 | 6/2002 | Casterlin et al. |
| 6,576,193 | B1 | 6/2003 | Cui et al. |
| 6,669,908 | B2 | 12/2003 | Weyker et al. |
| 7,052,651 | B2 | 5/2006 | Wang |
| 7,507,374 | B2 | 3/2009 | Gould et al. |
| 7,927,548 | B2 | 4/2011 | Slowey et al. |
| 8,025,851 | B2 | 9/2011 | Slowey et al. |
| 8,323,214 | B2 | 12/2012 | Hartselle |
| 8,871,155 | B2 | 10/2014 | Wu et al. |
| 10,035,146 | B2 | 7/2018 | Fuller et al. |
| 10,080,516 | B2 | 9/2018 | Ellis et al. |
| 2002/0150501 | A1 | 10/2002 | Robertson et al. |
| 2005/0119589 | A1* | 6/2005 | Tung .................. A61B 10/0045 600/584 |
| 2006/0013738 | A1 | 1/2006 | Ramsey |
| 2006/0121548 | A1 | 6/2006 | Robbins et al. |
| 2006/0292034 | A1 | 12/2006 | Gould et al. |
| 2006/0292035 | A1 | 12/2006 | Gould et al. |
| 2009/0226883 | A1 | 9/2009 | Wu et al. |
| 2009/0306543 | A1 | 12/2009 | Slowey et al. |
| 2010/0055717 | A1 | 3/2010 | Niskanen et al. |
| 2011/0151432 | A1 | 6/2011 | Zappia et al. |
| 2011/0151577 | A1 | 6/2011 | Zhang et al. |
| 2011/0165024 | A1* | 7/2011 | Wu ....................... B01L 3/5023 422/69 |
| 2012/0149124 | A1 | 6/2012 | Mink et al. |
| 2014/0161686 | A1* | 6/2014 | Bort .................. B01L 3/502784 422/502 |
| 2014/0305196 | A1 | 10/2014 | Ellis et al. |
| 2014/0316302 | A1 | 10/2014 | Nonnemacher et al. |
| 2015/0072346 | A1* | 3/2015 | Gellibolian ........ C12N 15/1017 435/287.2 |
| 2016/0121322 | A1* | 5/2016 | Fuller .................. G01N 33/487 422/417 |
| 2016/0243544 | A1* | 8/2016 | Hu ..................... A61B 10/0045 |
| 2020/0376483 | A1 | 12/2020 | Loudermilk et al. |
| 2021/0031184 | A1 | 2/2021 | Bailey et al. |
| 2022/0274102 | A1 | 9/2022 | Bailey et al. |

FOREIGN PATENT DOCUMENTS

| | | | | |
|---|---|---|---|---|
| CA | 2841941 | | 1/2013 | |
| CN | 1912617 | A | 2/2007 | |
| CN | 200510128570.X | | 2/2011 | |
| CN | 200680042131.X | | 5/2012 | |
| CN | 201010566805.4 | | 9/2012 | |
| CN | 204718871 | U | 10/2015 | |
| CN | 105814430 | A | 7/2016 | |
| CN | 109507412 | A | 3/2019 | |
| EP | 06817804.5 | | 9/2014 | |
| WO | 2007062575 | | 6/2007 | |
| WO | WO-2019017906 | A1 * | 1/2019 | ............ B01L 3/5023 |

* cited by examiner

ASSAY DEVICE AND RECEIVING DEVICE

CROSS REFERENCE OF THE RELATED APPLICATION

The present application claims the benefit of Chinese Patent Application No. 201910699245.0, filed on Jul. 31, 2019, and U.S. patent Application No. 62/880,777, filed on Jul. 31, 2019. The content of these applications including all tables, diagrams and claims is incorporated hereby as reference it its entirety.

FIELD OF THE INVENTION

The present invention relates to a device for collecting a fluid sample and an assay device, in particular to a device for collecting and detecting an analyte in a fluid sample in the field of rapid diagnosis, for example, a urine and saliva collection and assay device.

BACKGROUND OF THE INVENTION

The following background art information is only a general introduction of the background and will not constitute any restrictions on the present invention.

Currently, the device used to detect the presence of the analyzed substance in the detected sample is widely used in hospitals and households. These rapid diagnostic devices comprise one or more test strips, including pregnancy test, drug abuse detection, etc. The quick diagnosis assay device is very convenient, the device can show the detection result on the test strips in one minute, or ten minutes at most.

Drug detection is widely used in drug control authorities, Public Security Bureaus, drug treatment centers, physical examination centers, national conscription physical examination centers, etc. There are various kinds of drug detection, and the detection is very frequent. Some detections need sample collection and require a professional testing agency or laboratory for detection. Some detections have to be completed on the spot in a timely manner, for example, at roadside, people who drive after taking drugs ("drugged driving" for short) need to be tested on the spot so that the test result is obtained at once.

For example, for convenient collection of a saliva sample, the detection of a saliva sample is gradually accepted and welcomed by the testing agency or the testing personnel. Various sample collecting and testing devices for clinical or household purpose have been seen and described in some literatures. For example, the U.S. Pat. No. 5,376,337 discloses a saliva sample collector, wherein a filter paper is used to collect saliva from a subject's mouth and transfer the saliva to an indicator reagent. U.S. Pat. Nos. 5,576,009 and 5,352,410 disclose an injector-type fluid sample collector separately.

In another example, the United States Patent (with the application Ser. No. 14/893,461 and patent application no. US2016/0121322A1) discloses a sample assay device, this patent only discloses some detection schemes and principles, but actually it is difficult to achieve a specific product, for example, if a cover combination and a test combination match with each other, how can a suction tip for sucking a saliva be compressed, how to move, and how to effectively mix with a fluid, the actual effect is not ideal.

To solve the technical problem of some traditional products above, it is required make a modification and provide another way to overcome the shortage of the prior art.

SUMMARY OF THE INVENTION

Considering the above situation, in order to overcome the shortage of the prior art, the present invention aims to provide a device for receiving an analyte in a test fluid sample, and a receiving device used in combination with an assay device. The receiving device comprises a chamber, the chamber comprising a fluid chamber to accommodate a fluid and a piercing element that is movable in the device. "Receiving" in the receiving device therein does not constrain the specific purpose of the device, it can also be called a fluid treating and mixing device, or a fluid sample transfer and transport device, so it is called a device, the word of "Receiving" has not any limitation to the "device".

A first aspect of the present invention provides a device, the device comprising a chamber for accommodating a treatment solution and a piercing element, and the piercing element being movable in the device.

In some embodiments, the device comprises a chamber, the chamber of the device comprises a sealed chamber for accommodating a treatment solution and the chamber also comprises a piercing element that is movable in the device or in the chamber of the device.

In some embodiments, the device comprises a first chamber and a second chamber, wherein the first chamber is configured to accommodate a treatment solution, and the second chamber is configured to accommodate the whole piercing element or a part of the piercing element. In some embodiments, the first chamber is a sealed chamber, and the sealed chamber accommodates a treatment solution. In some embodiments, the first chamber comprises a sealed chamber, and the sealed chamber accommodates a treatment solution. In this way, the treatment solution is included in a separate sealed chamber, and the sealed chamber is then configured as a first chamber. It can be understood that there is no so called first chamber, a sealed chamber can be arranged on the position of the first chamber of the device, and the sealed chamber accommodates a treatment solution.

In some embodiments, the said piercing element comprises a piercing structure, the piercing structure is configured to pierce the first chamber of the device to release a treatment solution.

In some embodiments, the said piercing element comprises a chamber and the chamber is configured to transmit, mix, transport, transfer or treat a fluid sample. In the chamber of the piercing element, the fluid sample is mixed with the treatment solution, and the treatment solution can flow into the chamber of the piercing element to contact the fluid sample, or the solution in the chamber of the piercing element (the treatment solution, the mixed solution of the treatment solution and the fluid sample, or the fluid sample) is transferred onto the testing element for testing or assaying by piercing the chamber of the element.

In some embodiments, the chamber of the piercing element is used to receive an absorbing element, and the absorbing element is configured to absorb a fluid sample. In some embodiments, the chamber of the piercing element is configured to enable the mixing of the fluid sample and the treatment solution to form a mixed solution. In some embodiments, the mixed solution formed in the piercing chamber passes through the absorbing element and then flows to the testing element for testing or assaying.

In some embodiments, the piercing structure is configured on or in the chamber of the piercing element.

In some embodiments, the chamber of the piercing element comprises a first chamber and a second chamber, the first chamber is used to receive a treatment solution from the chamber for accommodating a treatment solution, and the second chamber is used to receive a fluid sample. In some embodiments, the fluid in the first chamber of the piercing element is communicated to that in the second chamber, so that the fluid sample and the treatment solution are mixed in the first chamber or the second chamber, thus, to form a mixed solution.

In some embodiments, the mixed solution is transferred to the testing element through the second chamber, in order to test the presence of an analyte in the solution sample.

In some embodiments, the second chamber of the piercing element is used to receive an absorbing element, and the absorbing element is used to absorb and suck a fluid sample, such as saliva, urine, sweat, and other fluid samples. When the absorbing element absorbs a fluid sample, the said second chamber indirectly receives the fluid sample. In some embodiments, the absorbing element is squeezed in the second chamber and the released fluid sample from the absorbing element flows into the first chamber of the piercing element and mixes with the treatment solution from the first chamber of the device or the first sealed chamber of the device.

In some embodiments, the mixed solution formed in the first chamber of the piercing element passes through the absorbing element in the second chamber, and then flows onto the testing element for testing or assaying.

In some embodiments, the piercing element completes the mixing, operation or flowing of the fluid through the piercing's moving. In some embodiments, the piercing element moves in the device, and during, before, or after the movement, the treatment solution contained in the first sealed chamber of the device is enabled to enter into the chamber of the piercing element, for example, the first chamber. For example, the piercing element moves so that the piercing structure pierces the first sealed chamber with the treatment solution therein, and allows the treatment solution to flow into the chamber of the piercing element. In some embodiments, the chamber of the piercing element is used to receive an absorbing element and compress the absorbing element to release the absorbed fluid sample into the chamber of the piercing element and mix with the treatment solution. This process is conducted before, during and after the movement of the piercing element, or at the same time as the movement.

In some embodiments, the piercing element has a first position and a second position in the chamber of the device, when the piercing element is at the first position, the piercing structure of the piercing element does not pierce the chamber accommodating a treatment solution; when the piercing element is at the second position, the piercing structure pierces the chamber accommodating a treatment solution.

In some embodiments, when the piercing element moves from the first position to the second position, or in the process of the movement, the first chamber of the piercing element or a part of the first chamber enters into the first sealed chamber accommodating a treatment solution, for example, in the first chamber of the device. The first chamber of the piercing element that enters into the chamber accommodating the treatment solution forces the treatment solution to enter into the first chamber of the piercing element. In some embodiments, the first chamber of the piercing element comprises a hole or a through-hole through which the treatment solution can enter into the first chamber. In some embodiments, the second chamber of the piercing element receives an absorbing element, and the absorbing element is squeezed to release the fluid sample before, during, or after the piercing element moves from the first position to the second position. The released fluid sample flows into the first chamber of the piercing element and mixes with the treatment solution.

In some embodiments, when or after the piercing element moves from the first position to the second position, the mixed solution (treatment solution, mixed solution of the treatment solution and the fluid sample, or fluid sample) in the first chamber of the piercing element returns to the second chamber of the piercing element and flows through the absorbing element onto the testing element. In some embodiments, the solution returning and passing through the absorbing element does not necessarily flow directly onto the testing element, but flows into a container for subsequent testing or assaying.

In some embodiments, the absorbing element is arranged on a sample collector, and the sample collector comprises a connecting rod and the absorbing element. The sample collector is inserted into the second chamber of the piercing element, and at the same time, the collector pushes the piercing element to move from the first position to the second position through pushing the second chamber of the piercing element. In some embodiments, the sample collector is combined or assembled with an accommodating element, the accommodating container has a connecting element, and the connecting element pushes the second chamber of the piercing element, so as to make the piercing element move from the first position to the second position. The connecting element is contracted with the piercing element when the collector is inserted into the second chamber of the piercing element.

In some embodiments, a partial or a part of piercing element is arranged in the second chamber of the device, the piercing element has the said first position and second position, or can move from the first position to the second position. In some embodiments, the first chamber of the piercing element is arranged in the second chamber of the device, and the first chamber of the piercing element has a first position and a second position in the second chamber of the device, or is movable from the first position to the second position.

In some embodiments, the first chamber and the second chamber of the device are in a sealed state or are sealed, or a gas or air in the first chamber and the second chamber of the device is compressed to increase the pressure in the chamber. In some embodiments, the first chamber accommodating a treatment solution is in a sealed state, and the treatment solution is sealed in the first chamber. When the solution is sealed, it is solution-sealed. In some embodiments, the second chamber of the device is sealed or the gas or air inside the second chamber is compressed to increase the air pressure. In some embodiments, using the piercing element or the partial piercing element to seal the second chamber of the said device. In some embodiments, the movement of the piercing element in the second chamber of the device makes the gas in the second chamber of the device compressed to cause an increase in air pressure. In some embodiments, the piercing element comprises an elastic seal ring that contacts with the inner wall of the second chamber of the device, thus, to seal the second chamber of the device.

In some embodiments, the first chamber of the device is arranged downstream of the piercing element, and the piercing element is arranged upstream of the first sealed chamber of the device, the movement of the piercing element is from upstream to downstream, thereby piercing the first chamber of the device. In some embodiments, the piercing structure is near to the first chamber of the device, the second chamber of the piercing element is away from the first chamber of the device, or the first chamber of the piercing element is between the second chamber of the piercing element and the first chamber of the device.

In some embodiments, the piercing structure of the piercing element is arranged on the first chamber of the piercing element. In another embodiment, the piercing structure is arranged on an outer wall of one end of the first chamber of the piercing element.

In some embodiments, the second chamber and the first chamber of the device are fluid communication or connected.

In some embodiments, the said device comprises a third chamber, and an inner wall of the third chamber adopts a thread structure and the thread structure cooperates or is engaged with the thread mechanism of the connecting element, so that the accommodating element combines with the device with a piercing element to form an integrated structure.

In some embodiments, the piercing element comprises a first chamber and a second chamber, and the first chamber and the second chamber are fluid connected, thereby forming a fluid channel.

In some embodiments, the first chamber is used to receive an absorbing element and the second chamber is used to receive the fluid sample on the absorbing element.

In some embodiments, the piercing element comprises a small hole or a through-hole and the through-hole connects the first chamber and the second chamber of the piercing element.

In some embodiments, the inner diameter of the first chamber of the piercing element is less or smaller than the inner diameter of the second chamber. In some preferred embodiments, the inner diameter of the first chamber is smaller than the diameter of the fluid absorbing element. In other words, the first chamber actually cannot allow the absorbing element to enter into the first chamber. In other words, make the second chamber to receive the fluid absorbing element, but try to avoid the fluid absorbing element to enter into the first chamber. “Try not to” doesn’t mean “can not”. In some embodiments, it is also possible to let the fluid absorbing element enter into the first chamber in whole or in part. In this way, the absorbing element is allowed to enter or is inserted into the second chamber of the piercing element, so as facilitate squeezing or compressing of the absorbing element. In a preferred embodiment, the absorbing element is squeezed or compressed to achieve the movement of the piercing element.

In some embodiments, the fluid absorbing element is fluid connected with the testing element of the assay device, which will be described in detail later. In this way, when the fluid absorbing element is compressed in the chamber of the piercing element, the fluid sample flows out. When the piercing element pierces the chamber accommodating or containing a treatment solution and the released solution mixes with the fluid sample to form a mixed solution, or the treatment solution contacts the absorbing element to elute the analyte on the absorbing element, so that the mixed solution flows into the chamber of the piercing element and contacts with the testing element that is contained in the chamber of the piercing element. Or, when the absorbing element is compressed in the second chamber of the piercing element, the fluid sample released by the absorbing element flows into the first chamber of the piercing element; and the first chamber of the piercing element is inserted into the chamber accommodating a treatment solution, the inserting would make the treatment solution enter into the first chamber of the piercing element to form a mixed solution with the fluid sample; flowing up the process of the inserting further into the chamber accommodating a treatment solution, the mixed solution in the first chamber of the piercing element flow back to the second chamber of the piercing element to, contacts the absorbing element or passes through the absorbing element to elute the absorbing element and form a new mixed solution which flows out of the piercing element; or optionally, flows on the testing element that is in fluid communication with the absorbing element for analyte detection.

In some embodiments, after the fluid absorbing element is compressed, the mixed solution enters into a channel through the absorbing element, and the channel connects the absorbing element and the testing element, so that the mixed solution can flow onto the testing element through the channel. The said channel is arranged in the connecting rod of the collector, the mixed solution passes through the absorbing element to elute some adsorbed substances on the absorbing element, after mixing with the fluid sample (the treatment solution), it can improve the testing performance on the testing element, for example, improving the testing sensitivity or specificity. This is because some fluid sample contains interfering substances that may affect the testing performance, and after mixing with a fluid, a mixed sample is formed to reduce the interference. It is also possible that some substances (analyzed substances) are adsorbed onto the absorbing element, and the substances have to be eluted by the fluid, such as the treatment solution, thereby improving the accuracy of the test.

In some embodiments, the chamber accommodating a treatment solution comprises a film that is easily pierced, such as a plastic thin film, a double-sided tape, or an aluminum foil thin film; this thin film seals the chamber accommodating a treatment solution, so it is easily pierced by the piercing structure.

In some embodiments, the piercing element is movable in a chamber with a treatment solution, moving from the initial first position to the second position. In some embodiments, when the piercing element is at the initial first position, the piercing end of the piercing element is arranged near the position where a thin film is easily pierced, and it will not actually pierce the thin film. Preferably, it is arranged at an upper end of a piercing thin film. Preferably, the piercing end of the piercing element contacts the piercing thin film.

In some preferred embodiments, a gap or clearance is reserved between the piercing element and the chamber accommodating the piercing element, and the gap or clearance is used to receive a part of the assay device, for example, receiving a connecting element of the assay device. In some embodiments, there is a gap or a space between the second chamber of the piercing element and the third chamber body of the receiving device, the space is convenient for the thread of the outer wall of the connecting element to match with the thread of the inner wall of the third chamber.

In some embodiments, the assay device comprises a testing element for detecting the presence of an analyte in a fluid sample. In some embodiments, the assay device comprises an absorbing element for absorbing the fluid sample. In some embodiments, the absorbing element is detachably assembled or fitted with the testing element. This will provide convenience for both production and processing, because the absorbing element needs to be sterilized before collecting and absorbing the fluid sample, such as high temperature and radiation sterilization. However, these steps will affect the chemical substance of the testing element, so before treatment of the absorbing element, it is necessary to separate it from the testing element; after the treatment is completed, it is combined with the testing element to facilitate production and assembly, thus reducing the adverse or negative effects on the testing element.

In some embodiments, the testing element is arranged in a carrier carrying the testing element, and the absorbing element is detachably assembled or fitted with the carrier.

In another embodiment, the testing element may be arranged on a carrier, and the carrier is included in a chamber accommodating the carrier. In some embodiments, the absorbing element is detachably combined with the testing element through the chamber accommodating a carrier, which is an indirect detachable combination.

In some embodiments, fluid communication is maintained between the absorbing element and the testing element, that is, the fluid can flow to the testing element through the absorbing element. This allows the testing element to complete detection of an analyte in a fluid sample on the absorbing element. The absorbing element is generally made of a material that can absorb a fluid, such as a sponge, a filter paper, a polyester fiber, etc.

In some embodiments, the absorbing element is in fluid communication with the testing element through a connecting rod. Therefore, a fluid channel is arranged in the connecting rod, which connects the absorbing element and the testing element or the carrier carrying the testing element.

In other embodiments, the carrier carrying the testing element is contained in a accommodating chamber, and the chamber accommodating the carrier comprises a space for accommodating the carrier, and the chamber comprises a connecting element that is connected to the said receiving device, thus to complete the transfer of a fluid sample.

In a second aspect, the present invention provides a method of treating a fluid sample, the method includes: providing a device, the device comprising a chamber for accommodating a treatment solution and a piercing element that is movable in the device, the piercing element moves so that the chamber containing the treatment solution is pierced, thus to release the treatment solution.

In some embodiments, the piercing element comprises a chamber, which allows the released treatment solution to enter into the chamber of the piercing element.

In some embodiments, the absorbing element is introduced into the chamber of the piercing element to contact with the treatment solution, thereby forming a mixture of the treatment solution and the fluid sample. The absorbing element is squeezed in the chamber of the piercing element to release a fluid sample, and the fluid sample is mixed with the treatment solution in the chamber to form a mixed solution (a first mixed solution). In some embodiments, the formed mixed solution is returned back to the absorbing element to contact with the absorbing element, thus, to form a new mixed solution (second mixed solution), and the new mixed solution is allowed to flow out of the piercing element. The solution flowing out of the piercing element is guided to flow into the testing element for testing or assaying of an analyte.

In some embodiments, the device has a first sealed chamber for accommodating the treatment solution, and a second chamber for accommodating the partial piercing element; wherein, the piercing element has a first position and a second position in the second chamber. The piercing element moves from the first position to the second position, so that the piercing structure on the piercing element pierces the first chamber accommodating the treatment solution and force the treatment solution in the first chamber enters into the chamber of the piercing element. In some embodiments, a partial chamber of the piercing element is allowed to enter into the first chamber containing the treatment solution. In some embodiments, the piercing element comprises a first chamber containing a piercing structure and a second chamber for receiving the absorbing element, when the first chamber of the piercing element enters into the first chamber containing the treatment solution, the treatment solution is forced to enter into the first chamber of the piercing element. In some embodiments, the second chamber of the piercing element receives the absorbing element and compresses the absorbing element to release a fluid sample, and the released fluid sample enters into the first chamber of the piercing element and mixes with the treatment solution to form a first mixed solution. In some embodiments, the mixed solution enters into the second chamber of the piercing element to contact with the absorbing element or pass through the absorbing element to form a second mixed solution, and the second mixed solution flows out of the piercing element and flow onto the testing element.

In some embodiments, the absorbing element is inserted into the chamber of the piercing element, thus, to compress the absorbing element, and simultaneously the piercing element is pushed from the first position to the second position. In some embodiments, the absorbing element is inserted into the second chamber of the piercing element and the absorbing element is compressed to release a fluid sample, and the released fluid sample flows into the first chamber of the piercing element. The absorbing element pushes the piercing element to move from the first position to the second position, so that the piercing element pierces the first chamber containing the treatment solution, and allows the first chamber of the piercing element to enter into the chamber containing the treatment solution, so that the treatment solution is forced into the first chamber of the piercing element and mixed with the fluid sample.

In some embodiments, the absorbing element is connected to a connecting rod, and a channel is arranged in the connecting rod and is in fluid communication with the absorbing element. In some embodiments, the second chamber of the device is sealed by the piercing element, and the second chamber and the first sealed chamber containing the treatment solution are in a sealed state. The absorbing element with a connecting rod is inserted into the second chamber of the piercing element, and the second chamber is sealed by the absorbing elements, the absorbing element is compressed in the second chamber, and simultaneously, the piercing element is pushed to move from the first position to the second position; during the movement, the sealed space of the device is compressed, so as to increase the air pressure; with the first chamber of the piercing element enters into the chamber containing the treatment solution, the increased air pressure and/or the first chamber of the piercing element enters into the sealed first chamber as to increase the pressure over the fluid force(s) the treatment solution to enter into the first chamber of the piercing element and mix with the fluid sample, and then, the further increased pressure makes the mixed solution flow into the second chamber of the piercing element and pass through the absorbing element into the channel of the connecting rod, thereby finally flowing on the testing element. The just increased air pressure (without the peruse over the fluid of the treatment solution) can make the mixed solution flow back on the absorbing element separately, thereby eluting the absorbing element and flowing out of the piercing element, as long as the piercing element pierces the first sealed chamber, and the piercing element directly and indirectly communicated with the first sealed chamber, the increased pressure forces the treatment solution to enter into the chamber of the piercing element, because there is a pressure difference between the chamber of the piercing element and the device that is compressed to increase the air pressure therein.

In a third aspect, the present invention provides an assay device and the assay device comprises a testing element, wherein the testing element is arranged in a carrier, and the carrier comprises a chamber, and the chamber is in fluid communication with an absorbing element.

In some embodiments, the said carrier comprises a slot for setting the testing element, with one end of the slot communicating with an opening of the chamber in the carrier. In some embodiments, the chamber comprises a fluid inlet, the fluid inlet being one end of the fluid inlet channel. In some embodiments, a diversion element like a diversion strip, is arranged in front of the fluid inlet, with one end of the diversion element being arranged before the fluid inlet, and the other end being contact with the test strip to achieve fluid flowing.

In some embodiments, the said chamber is divided into a first area and a second area by a dividing structure, the dividing structure is arranged near the fluid inlet, and one end of the diversion strip is arranged in a first area between the inlet and the dividing structure; and the other end of the drainage strip contacts with or overlaps on the testing element; preferably, the other end thereof contacts with or overlaps on a sample feeding area of the testing element. In some embodiments, the said second area is configured to receive excessive fluid sample from the fluid inlet. In some embodiments, the sample feeding area of the testing element is arranged on the opening of the chamber and is in contact with the dividing strip. The fluid sample may be a fluid sample itself, or a mixed solution with a treatment solution or a treatment solution alone, and it can also be a sample defined by the present invention.

In some embodiments, the said carrier comprises a vent hole communicating with the outside atmosphere. The carrier is in a sealed space after assembly, and the chamber on the carrier is used to receive a fluid from the inlet channel. In one embodiment, the inlet channel is connected to a connecting rod, and a connecting rod is connected to an absorbing element. When the absorbing element is inserted into the chamber of the said piercing element, such as the first chamber, with the movement of the piercing element, the fluid sample and the treatment solution are transferred into the chamber of the carrier, in order to reduce the resistance in the sealed chamber of the carrier, a vent hole that is communicated to the outside is arranged to facilitate the rapid entry of a fluid into the carrier. As described above, when the piercing element and the receiving device form a sealed space, a pressure difference is formed between the sealed space and the chamber of the piercing element, the pressure difference can make the mixed solution formed by the treatment solution and a fluid sample to quickly enter into the chamber of the carrier, and flow on the testing element for testing or assaying of an analyte.

In some embodiments, the assay device further comprises an accommodating element containing an accommodating chamber, which is configured to accommodate the carrier containing a testing element. The accommodating chamber is mainly used to facilitate combination of a test carrier and a collector, thus, to facilitate assembly and operation. In some embodiments, the accommodating chamber comprises a slide way, and the carrier comprises a slide rail that fits with the slide way so that the carrier is easily inserted into the accommodating chamber. In some embodiments, the direction of the carrier being inserted into the accommodating chamber is determined or unique. The determined direction here means that the carrier has a front side and a back side, and the front side is generally a layer with a test strip and the test strip is covered by a thin film. Generally, it is a transparent thin film, which allows the test result of the test strip to be read by a naked eye or a machine. In this way, when the carrier is inserted or assembled into the accommodating chamber, it is necessary to make the front side always face to one side of the accommodating chamber, and the back side always faces to the other side of the accommodating chamber. Therefore, in some embodiments, the carrier comprises a limiting structure, which makes the carrier inserted into accommodating chambers in only one direction. In some embodiments, the limiting structure is arranged on the back side of the carrier. In a specific embodiment, the slide way of the accommodating chamber consists of two rails, and the two slide rails on the carrier are respectively formed by a side of the carrier, and the limiting structure is arranged between the slide rails. Through the cooperation of the slide way with the slide rail and a stopper, the carrier enters into the accommodating chamber in only one direction. Therefore, the carrier and the accommodating chamber are assembled in a detachable manner. In one embodiment, the accommodating element comprises a connecting element, a thread structure is arranged on the outer surface of the connecting element, which cooperates with the internal thread of the third chamber of the device to facilitate the connection with the receiving device, thus to achieve the transmission or transportation of a fluid sample.

In some embodiments, a small hole for one end of the connecting rod to pass through is arranged between the connecting element and the accommodating chamber, so as to make one end of the connecting rod connected to the inlet channel on the carrier and the other end connected to the absorbing element. In this way, the channel in the connecting rod communicates with the inlet channel of the carrier, so that the solution from the absorbing element can flow into the chamber of the carrier through the channel, thereby flowing to the testing element through the diversion element. This connection is a detachable connection.

In some embodiments, the said connecting rod comprises a bulge, and the bulge fits with an inner wall of the connecting element to ensure the position where the connecting rod is inserted into the small hole is more accurate. In some embodiments, the connecting rod is an annular bulge, which makes the connecting rod coincides with the longitudinal axis of the connecting element. In some embodiments, a thread is arranged at one end of the connecting rod, and a thread is arranged at the inlet channel on the carrier, and the thread of the connection rod can cooperate with the thread of the inlet channel, so that the collector is detachably combined with the carrier. This combination allows the absorbing element with a collector and the testing element to be separately treated before assembly.

In some embodiments, the collector has an elastic sealing element, such as a seal ring, and the seal ring is used to fit with the chamber of the piercing element, when the absorbing element is inserted into the chamber of the piercing element, the seal ring fits with the inner wall of the chamber of the piercing element for sealing, so that when the absorbing element is squeezed, the fluid sample on the absorbing element will not leak out of the piercing element, and the fluid sample will flow into the chamber of the piercing element.

In a fourth aspect, the present invention provides a system for detecting an analyte in a fluid sample, the system comprises the said receiving device and the assay device, the assay device comprises a collector, and the collector comprises an absorbing element. In some embodiments, the collector and the assay device are detachably assembled. In some embodiments, the assay device comprises a testing element, and the testing element is arranged in a carrier, and the carrier comprises a chamber for receiving a solution from an absorbing element.

In a fifth aspect, the present invention provides a method for detecting an analyte in a sample, the method provides the assay device and receiving device described above, the assay device comprises an absorbing element and the absorbing element is in fluid communication with a test strip in the assay device, the said receiving device comprises a sealed first chamber for containing the treatment solution and a piercing element, wherein the piercing element comprises a piercing structure and a chamber; the absorbing element is inserted into the chamber of the piercing element, thus to compress the absorbing element and release the fluid sample.

In some embodiments, the absorbing element on the assay device is used to collect a fluid sample, and then the absorbing element is inserted into the chamber of the piercing element.

In some embodiments, the piercing element moves in the receiving device and the piercing element pierces the chamber containing the treatment solution, so that the treatment solution enters into the chamber of the piercing element. In some embodiments, the treatment solution is mixed with the fluid sample to form a first mixed solution. In some embodiments, the first mixed solution flows onto testing element of the assay device through the absorbing element.

In some embodiments, the piercing element has a first position and a second position in the receiving device, when the piercing element is at the first position, the piercing structure does not pierce the first chamber containing the treatment solution. When the piercing element is at the second position, the piercing structure pierces the first chamber containing the treatment solution.

In some embodiments, when the piercing element is at the first position, the absorbing element is inserted into the chamber of the piercing element and the absorbing element is compressed to release the fluid sample into the chamber of the piercing element. In some embodiments, the assay device pushes the piercing element to move from the first position to the second position, thereby piercing the sealed first chamber, and the treatment solution in the first sealed chamber flows into the chamber of the piercing element and mix with the fluid sample, thus to form a first mixed solution.

In some embodiments, the piercing element forms a sealed space in the receiving device, and the sealed space is compressed by movement of the piercing element, thereby increasing the pressure in the sealed space. In some embodiments, the increased pressure forces the treatment solution in the first sealed chamber to flow into the chamber of the piercing element and mix with the fluid sample to form a first mixed solution.

In some embodiments, the assay device pushes the piercing element to move from the first position to the second position, thereby piercing the sealed first chamber, and the treatment solution in the first sealed chamber flows into the chamber of the piercing element and contact with the absorbing element.

Beneficiary Effects

The above-mentioned structure can help achieve high-sensitivity detection, and the absorbing element is detachably assembled with the testing element, which reduces the installation cost and also the damage to the testing element caused by different treatments.

DETAILED DESCRIPTION

Figure 1:
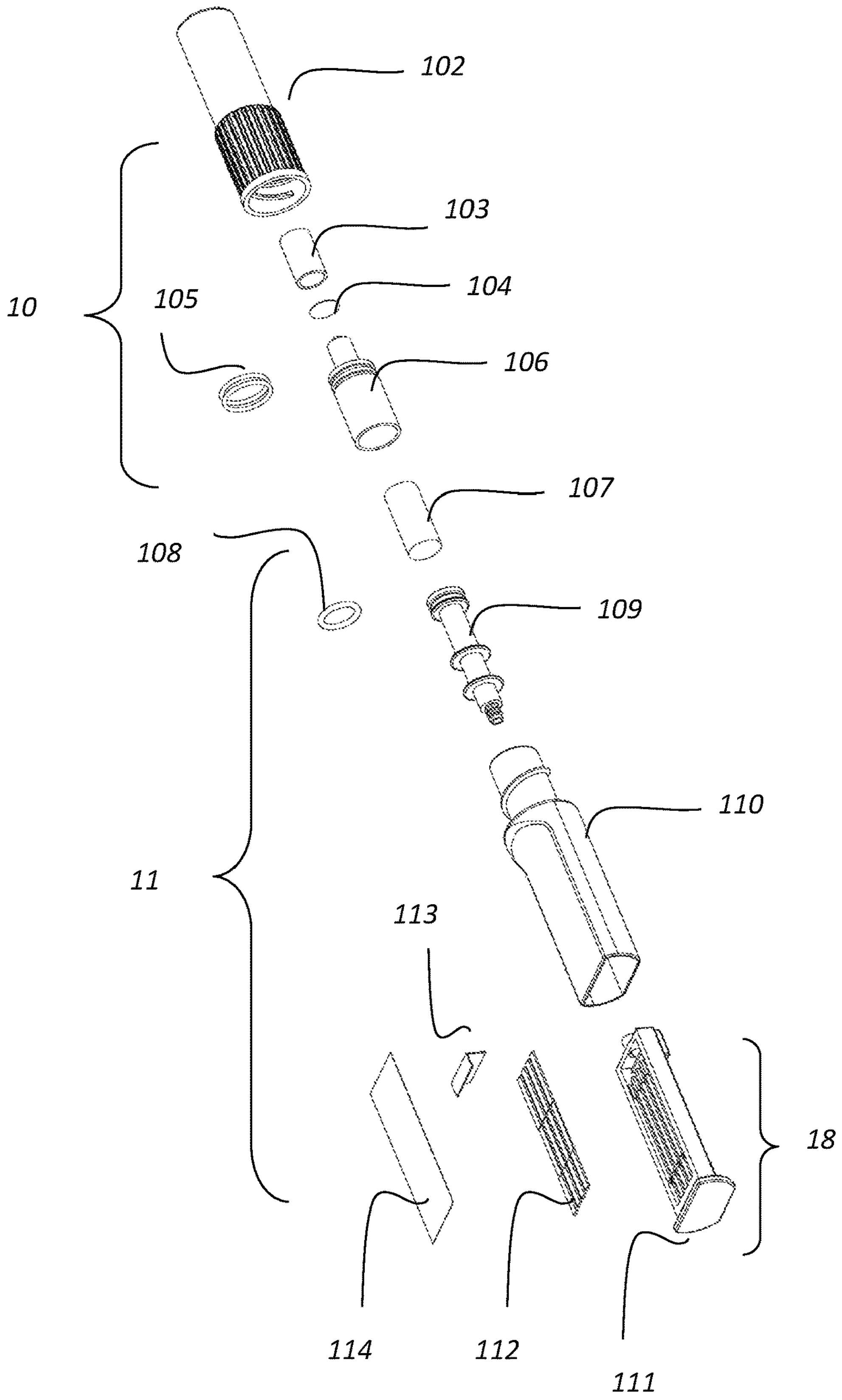
FIG. 1 depicts a structural decomposition diagram of a receiving device and an assay device according to a specific embodiment of the present invention.

The following is a further explanation of the structures involved in the invention or of the technical terms used, unless specifically specified, they will be understood and interpreted in accordance with the general terms in use in the field.

Test

A test is to conduct experiment or test to determine the presence of a substance or material, for example, but not limited to, chemicals, organic compounds, inorganic compounds, metabolic products, drugs or drug metabolites, organic tissue or metabolites of organic tissues, nucleic acids, proteins, or polymers. In addition, a test indicates the quantity of a substance or material tested. Furthermore, test also means immunity test, chemical test, enzyme test, etc.

Sample

Sample that is detected by the assay device of the present invention or the sample that is collected includes a biological fluid (such as a case fluid or a clinical sample). The liquid sample or a fluid sample is derived from solid or semi-solid samples, including feces, biological tissues and food samples. The solid or semi-solid samples is converted into the liquid samples by any suitable method, such as mixing, mashing, macerating, incubating, dissolving or utilizing enzymolysis to digest the solid samples in suitable solutions (such as water, a phosphate solution or other buffer solutions). "Biological samples" include animal, plant and food samples, for example, including urine, saliva, blood and its components, spinal fluid, vaginal secretions, sperms, feces, sweat, secretions, tissues, organs, tumors, cultures of the tissues and the organs, cell cultures and media derived from humans or animals. The preferred biological sample is urine; and the preferred biological sample can also be saliva. The food samples include food processing substances, final products, meat, cheese, wine, milk and drinking water. The plant samples include any plants, plant tissues, plant cell cultures and media. "Environmental samples" are derived from environment (for example, the liquid samples from lakes or other water bodies, sewage samples, soil samples, groundwater, seawater and waste liquid samples). The environmental samples may also include sewage or other wastewater.

A suitable detection element or testing element of the present invention is used to detect any analyte. The present invention is preferably utilized to detect small drug molecules in the saliva and the urine. Of course, the collection device of the present invention can collect any of the above samples, either solid or liquid at the very beginning, as long as the liquid or the liquid sample is absorbed by an absorbing element. The absorbing element 107 herein are generally made of absorbent materials (dry at the beginning), and can absorb liquid sample or fluid sample through the capillary or other characteristics of the absorbing element, so as to retain the fluid sample in the absorbing element. The absorber material is any material that can absorb liquid materials, such as sponge, filter paper, polyester fiber, gel, non-woven fabrics, cotton, polyester thin film, yarn, etc. Of course, the absorbing element is not necessarily made of water absorbent materials, and it is made of non-absorbent materials. However, there are holes, threads and holes on the absorbing elements so samples are collected on the above structures, the samples are generally solid or semi-solid ones that are filled between threads, in holes, or holes, thus, to collect samples. Of course, optionally, the absorbing element may be made of non-absorbent fibers and hair, and these materials are used to scrape a solid, semi-solid or liquid sample, so that these samples are kept on the absorbing element.

Downstream and Upstream

Downstream or upstream is defined by the direction in which a liquid or a fluid generally flows from upstream to downstream. Liquid in the downstream region or received from the upstream region: the liquid can also flow along the upstream region to the downstream region. It is generally defined by the direction in which the liquid flows. For example, in some materials where capillary force is used to make the liquid flow; the liquid can flow against gravity in the opposite direction to gravity. In this case, the upstream and downstream of the liquid are also defined by the direction in which the liquid flows. For example, in the assay device 102 of the present invention, after the absorbing element absorbs a fluid sample or a liquid sample, the fluid can flow from the absorbing element 107 to the sample feeding area 1121 of the testing element 112, at this time the flow of the liquid from the sample feeding area 1121 to the absorption area 1123 is from upstream to downstream; in the process, the liquid passes through the test area 1122 which comprises a detection area 1126 and a detection result control areal 125. The test area may be formed by a polyester fiber thin film, and the sample feeding area may be formed by a glass fiber. At this time, the absorbing element 107 is at the upstream of the sample feeding area of the testing element.

The upstream and downstream herein may be the movement trajectory or direction of an object, but not the flow direction of a liquid. For example, as shown in FIGS. 19-22, the piercing element is moved from upstream to downstream, at this time, the chamber containing a treatment solution is basically in a stationary state, and the piercing element moves from top to bottom and gradually approaches the chamber containing the treatment solution, for example, pierce the sealed chamber containing the treatment solution, and continue to enter into the sealed chamber. Movement of the piercing element and the treatment solution or the fluid sample may be in opposite directions, which may opposite in the whole process or in a part of the process. For example, the piercing element moves from top to the bottom, and the treatment solution flows in the opposite direction of that of movement of the piercing element. For another example, the piercing element moves from top to bottom, and the fluid sample initially flows from top to bottom (in the piercing element), with continuous movement of the piercing element, after the fluid sample is mixed with the treatment solution, the mixed solution can flow in the opposite direction in which the piercing element moves.

Gas Communication or Fluid Communication

Gas communication or fluid communication means liquid or gas can flow from one place to another, and may pass by physical structure that plays a role of guidance during the flow process. The so-called passing by the physical structures generally means the liquid pass by the surface of the physical structure, or the internal space of the structure so that it passively or actively flows to another place; passive flow is a flow caused by application of an external force, for example, the flow under capillary action, pressure effect, etc. The flow herein can also flow of a liquid or a gas due to its own action (gravity or pressure), or it is a passive flow; the fluid under the air pressure may flow naturally, and may also in the opposite direction, or it can also be a flow from one position to another under the effect of air pressure. The communication here does not necessarily mean that a liquid or gas is required, but indicates the connection relationship or state between two objects only in some cases. If there is a liquid, it can flow from one object to the other. Here, it refers to the state where two objects are connected; on the contrary, if there is no liquid or gas communication between the two objects, and there is liquid in or on an object, the liquid cannot flow into or on the other object, this is non-communication, non-liquid or gas-communicated state.

Detachable Combination

Detachable combination refers to the connection relationship between two components are in several different states or positional relationships, for example, when they are two physical components, they are separate at the beginning; when they are connected or combined in an appropriate first situation; when in an appropriate second situation, they is separated; however, the above separation is a spatial separation in a physical sense, without contact. Or, the two components are combined together at the beginning, and the two components are spatially separated in a physical sense when appropriate. Or alternatively, the two objects are separated at the beginning, and are combined together as needed to achieve a certain function, and then separated, or combined again for a certain purpose later. To sum up, the combination or the separation of the two is easily achieved, and such combination or separation is repeated for a number of times, also, it can also be a one-time combination and separation. Further, it is a detachable combination between two components, or a detachable combination of three or more components. For example, there is a first component, a second component and a third component, it is a detachable combination between the first component and the second component, a detachable combination between the second component and the third component, and the second component and the third component can also be in a detachable combination or a separation. In addition, the combination method is such that the two objects themselves are detachable, and the two can also be combined indirectly through another object. The absorbing element 107 is detachably combined with the testing element 112, and this detachable combination is direct or indirect, the details will be described below. The carrier 111 with a testing element and the chamber 110 of the accommodating element are also in a detachable combination, they are combined to form an assay device, but after disassembly, they will have their own applications. In the present invention, after the absorbing element is separated from the testing element, the absorbing element is sterilized separately by the methods, such as high-temperature, X-ray and radiation sterilization; combined with the testing element again after sterilization is completed. In this way, the absorbing element is in fluid communication with the testing element, so that liquid from the absorbing element can flow from the absorbing element on the testing element.

Testing Element

The so-called "testing element" herein refers to the element that can detect whether a sample or a sample contains the analyte of interest. This detection is based on any of the technical principles, such as immunological, chemical, electrical, optical, molecular, nucleic acid, physical principles. The testing element can use a lateral flow test strip, and the test strip can detect a plurality of analytes. Of course, other suitable testing elements can also be applied in the present invention.

Various testing elements is combined and used in the present invention. One of the forms is a test strip. A test strip used to analyze the analyte in a sample (such as a drug or a metabolite that indicates a medical condition), is in various forms, such as immunoassay or chemical analysis. Test paper can adopt the analysis mode of a non-competition law or a competition law. The test paper generally includes an absorbent material with sample feeding area, a reagent area and a test area. The fluid or liquid sample is added to the sample feeding area, and flows to the reagent area through capillary action. In the reagent area, if an analyte is present, the sample will bind to the reagent. Then, the sample continues to flow to the detection area. Other reagents, such as molecules specifically bonded with the analyst, are fixed in the detection area. The reagents react with the analyze (if any) in the sample and bind to the analyze in the area or bind to one of the reagents in the reagent area. The marker used to show a detection signal exists in a reagent area or a separated marker area.

The typical non-competitive analysis model is that if the sample includes the analyte, a signal is generated; if the sample does not include the analyte, a signal may not be generated. In competition law; if the analyte does not exist in the specimen, a signal may be generated; if the analyte exists, a signal may not be generated.

The testing element may be a kind of test paper, and it can also be an absorbent material or a non-absorbent material. The test paper can include various materials for transferring a liquid specimen. Wherein, the material of one kind of the test paper may be covered over another material, for example a filter paper covered over a nitrocellulose membrane. One area of the test paper can use one or more materials, and the other area can use one or more of the other different materials. The test paper is attached to a support or a hard surface to improve the strength to hold the test paper.

The analyte is detected by a signal generating system, fixing one or more compositions of the signal generating system in the analyte detection area of the test paper by using one or more enzymes that react specifically with the analyte, and or the method of fixing the specific binding substance on the test paper as described above. The substance that produces a signal may be in the feeding area, the reagent area, or the detection area, or on the entire test paper, and the substance may be filled with one or more of the materials on the test paper. Adding a solution including a signal to the surface of the test paper or to immerse one or more of the materials of the test paper in a solution containing a signal. Drying up the test paper containing the signal solution.

All areas of the test paper are arranged in the following ways: a sample feeding area, a reagent area, a detection area, a control area, an area for determining adulteration in the sample and a liquid sample absorption area. The control area is arranged behind the detection area. All areas are arranged on a piece of test paper containing only one material. However, different materials are used in different areas. All areas are in direct contact with the liquid specimen, or different areas is arranged according to the flow direction of the liquid specimen, and the rear end of each area is connected and to the front end of another area and overlapped with each other. The material used is excellent water-absorbent materials, such as filter paper, glass fiber or nitrocellulose membrane. The test paper can also be used in other forms.

The commonly used reagent strip is a nitrocellulose membrane reagent strip. The detection area includes a nitrocellulose membrane (NC), and specific binding molecules are fixed on the nitrocellulose membrane to indicate the detection result; it can also be a cellulose acetate membrane or a nylon membrane. For example, the test strip or device containing a test strip of the following patents: U.S. Pat. Nos. 4,857,453; 5,073,484; 5,119,831; 5,185,127; 5,275,785; 5,416,000; 5,504,013; 5,602,040; 5,622,871; 5,654,162; 5,656,503; 5,686,315; 5,766,961; 5,770,460; 5,916,815; 5,976,895; 6,248,598; 6,140,136; 6,187,269; 6,187,598; 6,228,660; 6,235,241; 6,306,642; 6,352,862; 6,372,515; 6,379,620; 和 6,403,383. The test strips disclosed in the above patent documents and the similar devices with a test strip is applied to the testing element or testing device of the invention for detecting analyte, for example the detection of a divided substance from the specimen.

The test strip applied to the present invention is commonly referred to as a lateral flow test strip, and the specific structure and detection principle of the detection reagent strips are known to general technicians in the field in the prior art. An ordinary test strip (FIG. 2) comprises a sample collection area or a sample feeding area 1121, a marker area (not shown), a detection area 1122 and a water absorption area 1123, wherein the sample collection area includes a sample receiving pad, the marker area includes a marking pad, the water absorption area can include a water-absorbing pad, the detection area includes the necessary chemical substances that can detect the presence of an analyte, such as an immunological reagent or an enzyme chemical reagent. The commonly used test strip is a nitrocellulose membrane strip, that is, the detection area 1122 includes a nitrocellulose membrane, and specific binding molecules are fixed on the nitrocellulose membrane to indicate a detection result; it can also be a cellulose acetate membrane or a nylon membrane, etc. Also, the detection area can also include a detection result control area 1125 in the downstream, generally, the control area and the detection area appear in the form of horizontal lines 1126, which are called a detection line 1126 or a control line 1125. The test strip is a conventional reagent strip, and it can also be other types of reagent strips that detect by the capillary action. Furthermore, a test strip generally includes a dry chemical reagent component, such as a fixed antibody or any other reagent, when encountering a liquid, the liquid flows along the reagent strip under the capillary action, and the dry reagent component is dissolved in the liquid during the flow process, reacts with the dry reagent of the area in the next area, thus to carry out the necessary detection. The liquid flows depending on the capillary action. All of the above is applied to the assay device of the present invention, or arranged in a detection chamber to get contact with a liquid sample, or used to detect the presence or amount of an analyte in a liquid sample that enters into the detection chamber.

In addition to testing the presence of an analyte in the liquid sample by using the above test strip or lateral flow test strip to contact with a liquid sample; the testing element of the present invention is used as an assay device to detect the analyte in the sample, so the assay device itself is equivalent to the testing element. For example, after the fluid sample is mixed with the treatment solution, the testing element is used for detection directly. Specific descriptions are given below. When describing using a receiving device to treat the fluid sample, the testing element is used for detection alone.

Carrier Element

Figure 2:
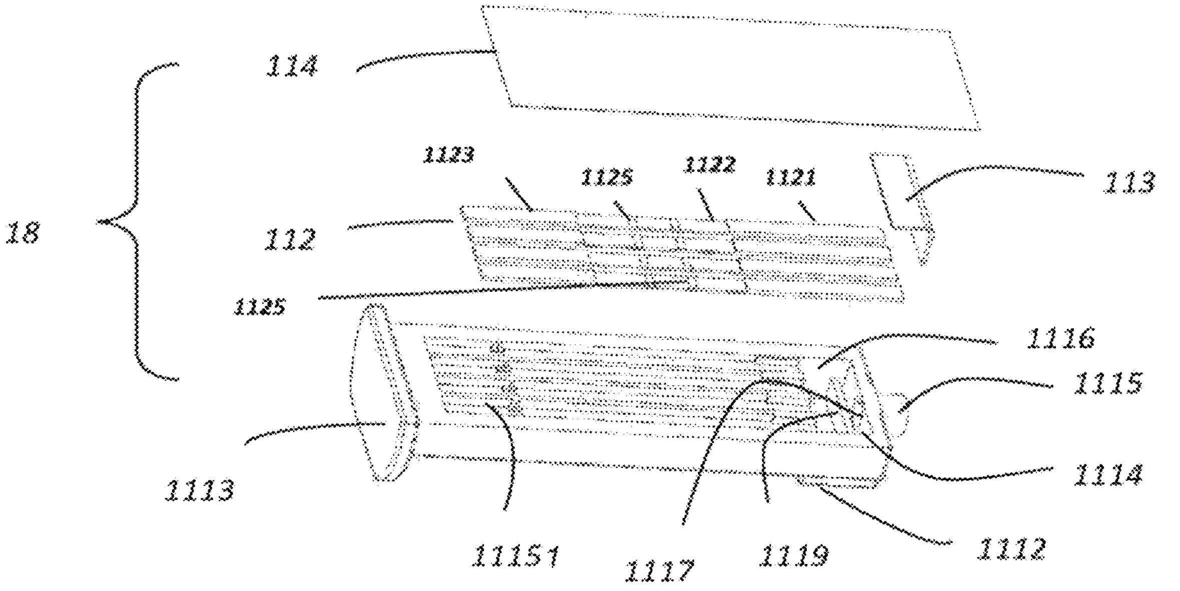
FIG. 2 depicts a structure diagram of a carrier with a testing element according to a specific embodiment of the present invention.
Figure 4A:
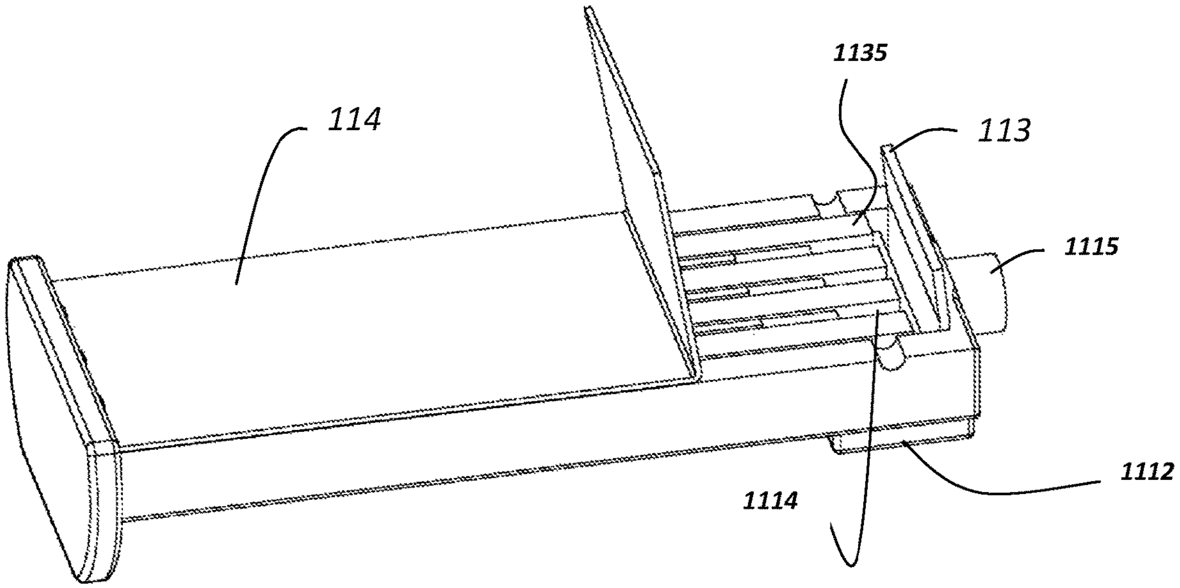
FIG. 4A depicts a three-dimensional decomposition diagram of position relationship of a diversion element and a carrier chamber after a testing element carrier is assembled in a specific embodiment of the present invention.
Figure 4B:
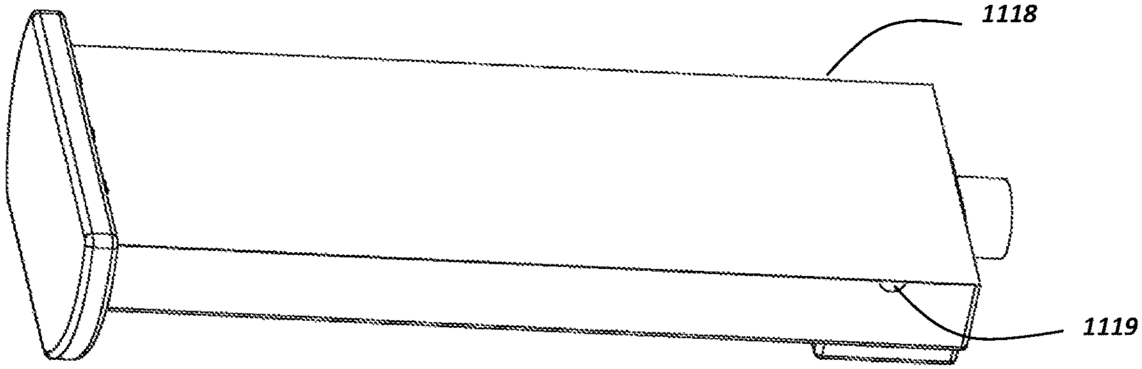
FIG. 4B depicts a three-dimensional structure diagram after a testing element carrier is assembled in a specific embodiment of the present invention.
Figure 5:
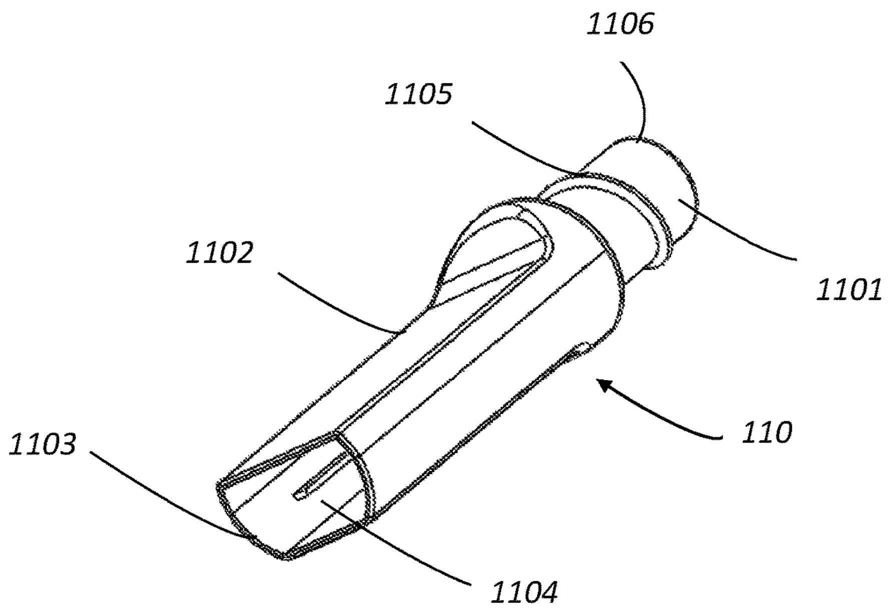
FIG. 5 depicts a three-dimensional structure diagram of an accommodating element according to a specific embodiment of the present invention.
Figure 6:
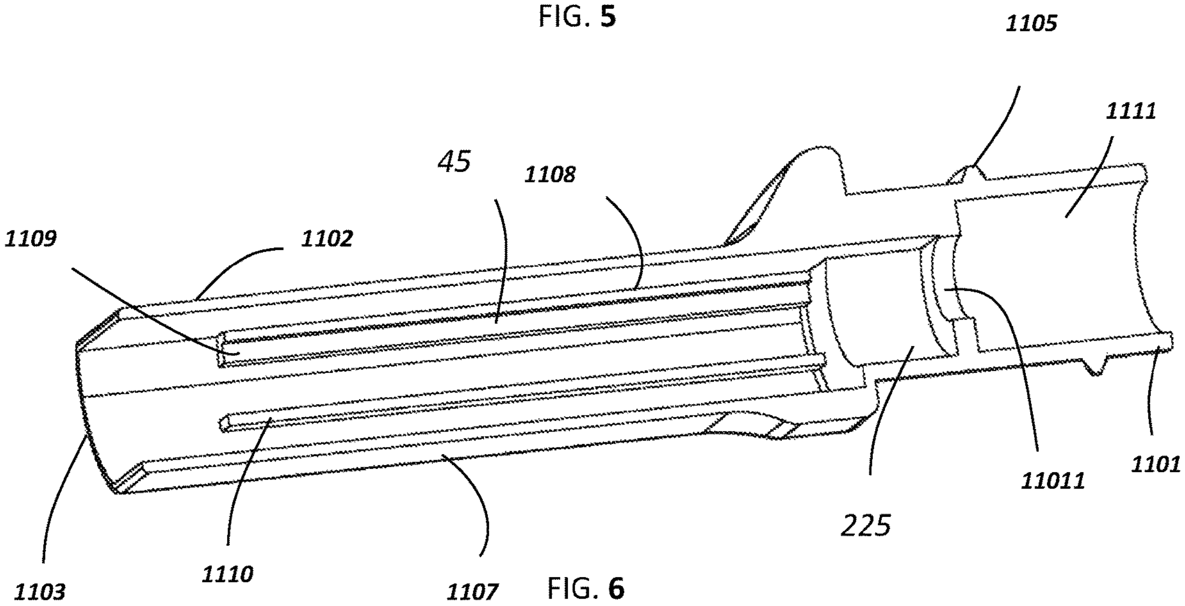
FIG. 6 depicts a three-dimensional structure diagram of a longitudinal section of an accommodating element according to a specific embodiment of the present invention.
Figure 7:
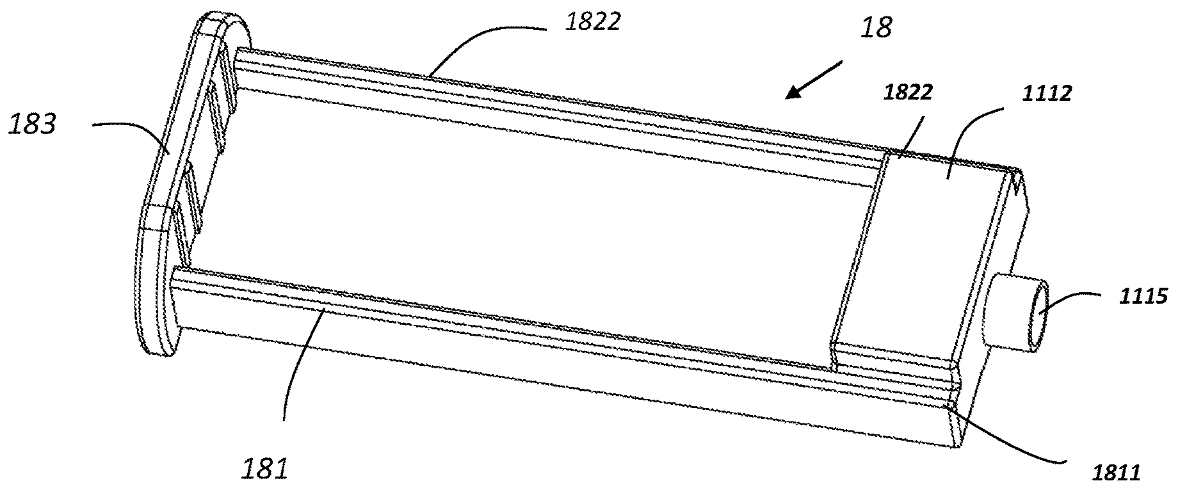
FIG. 7 depicts a back structure diagram of a carrier according to a specific embodiment of the present invention.

In some specific embodiments, the testing element may also be arranged on some carrier elements, and the carrier element includes a testing element, which is used for testing or assaying of an analyte in the fluid sample. Therefore, in some embodiments, the assay device comprises a carrier which has a testing element. As shown in FIG. 2, for example on some carriers 111, generally there is one or more grooves 11151 on the carrier, a testing element is arranged in the groove 11151, the carrier generally has a front side and a back side and the testing element is arranged on the front side of the carrier. The quantity of grooves is not limited, generally one testing element is arranged in one groove, and one testing element can detect one analyte in the sample; Of course, one testing element can also detect one or more, one or more kinds of analytes simultaneously. In some embodiments, the carrier 111 comprises a chamber 1116 with an opening, and a recessed area is arranged near the groove area to form the chamber 1116, the horizontal position of the opening 1114 of the chamber and the bottom of the groove area where the testing element is arranged are basically on the same plane. In some embodiments, the length of the groove is less than the length of the testing element, so that when the testing element is arranged in the groove, a partial area of the testing element suspends over the opening 1114 of the chamber 1116 (as shown in FIG. 4A). The chamber 1116 comprises a dividing element and the dividing element divides the chamber 1116 into a first area and a second area, the dividing structure is similar to a baffle 1119, and the baffle is arranged in front of a liquid channel inlet 1117 on the carrier, but the baffle does not cross the whole chamber, but reserves a notch (not shown) on both sides of the chamber, that means, the width of the baffle is smaller than the width of the chamber. In this way, the liquid flowing in through the liquid channel inlet 1117 can flow into the second area of the chamber through the notch. Of course, the width of the baffle 1119 can also be equal to the width of the chamber, and the height of the baffle is smaller than the depth of the chamber. In this way, excessive liquid can flow over the baffle into the second area for storage. In some embodiments, the baffle 1119 divides the chamber 1116 into a first area 1122 between the baffle 1119 and the liquid channel inlet 1117, and the remaining is a second area 1120 of the chamber. The second area is mainly used as a fluid sample cushion area. When excessive liquid flows into the chamber 1116, a partial liquid flows into the testing element, and the excessive liquid may flow into the second area 1120. The general shape of the chamber is a cuboid, of course, it is in other shapes, such as a cube or a cylinder. In some embodiments, a diversion element 113 is further arranged on the carrier 111, and the diversion element 113 connects the liquid inlet 1117 and the testing element, or the sample feeding area 1121 of the testing element. For example, a part of the diversion element 1131 is arranged in the first area between the baffle 1119 and the liquid inlet 1117, and another part 1133 overlaps or covers a part of the sample feeding area 1121, so that when the liquid from the liquid channel inlet or the liquid inlet 1117 enters into the carrier, it can directly contacts the guiding element, thereby the liquid is flowed on the testing element through the diversion element.

Figure 3:
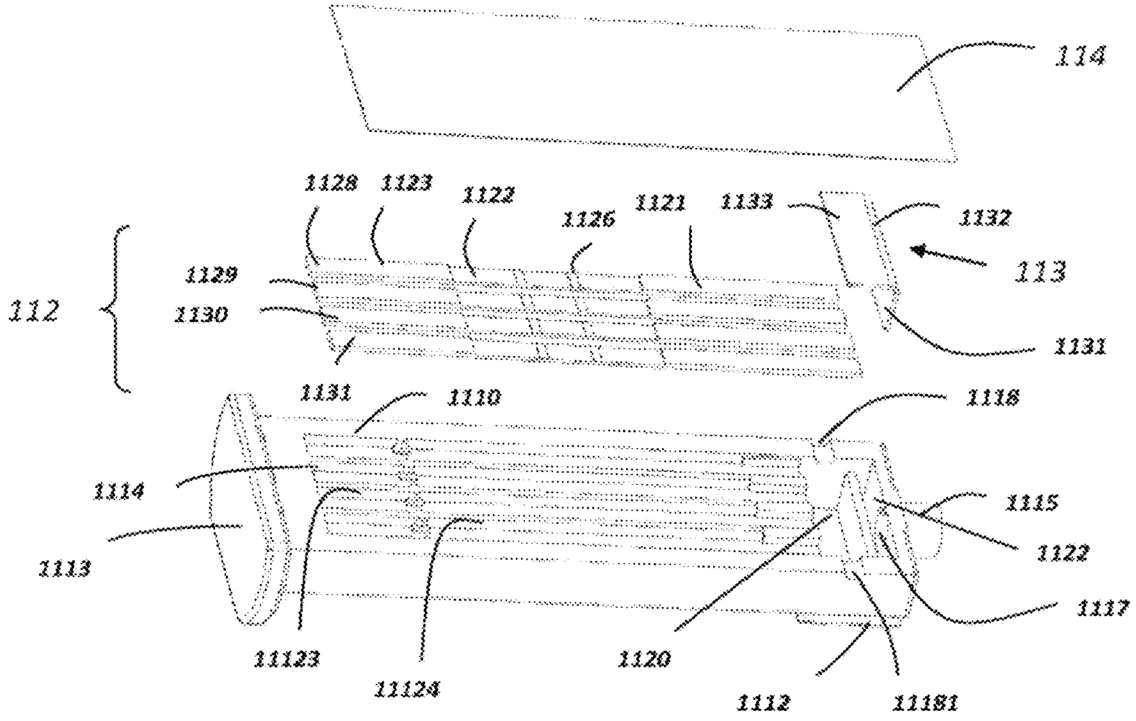
FIG. 3 depicts a structure diagram of a carrier with a testing element according to another specific embodiment of the present invention.

A baffle or a dividing element or a dividing structure is arranged in front of the liquid inlet 1117, and is mainly used to prevent an impact on the diversion element when a large amount of liquid sample flows through the liquid inlet or the liquid flows in a high speed, thus to prevent the diversion element from being washed away or deformed by the impact, this can exert a stable draining effect, the diversion element is generally made of a water-absorbent material, such as a glass fiber sheet. If there is excessive sample, it can flow into the second area of the chamber 1116, the second area has a function of diversion, because the test strip may be flooded if excessive liquid sample flows to the sample feeding area through the diversion element 113, and in this way, the flooding phenomenon is reduced. The diversion element 113 can also be used relieve the fluid impact, because once some liquid enters into the liquid inlet 1117, the liquid may first contact the diversion element 113, the diversion element can also have an effect of blocking the liquid, thereby delaying the liquid from entering into the second area of the chamber. If a different operation method is used or the force for inserting into the piercing element is different, sometimes the liquid will flow into the carrier at a faster speed and it may cause a great impact, and drainage will weaken the impact, thus to prevent the liquid from flowing into the chamber in a ways similar to "jetting". If the amount of liquid is large, it will flow to the second area, and the flow method is to pass through the notch between the baffle and the chamber, or directly flow over the baffle into the second area. In addition, the diversion element can guide fluid to flow to the area of the diversion element covering the test strip, so that multiple test strips may obtain an equal amount of the liquid sample. A gap is reserved between the baffle 1119 and the liquid inlet 1117, that means arranging a part of the diversion element between the baffle and the liquid inlet, on one hand it can have a drainage effect, and the baffle is intended to prevent the diversion element 113 from changing location, the diversion element is generally formed by soft filter paper, a glass fiber and others, under the impact of the liquid in the liquid inlet, if the position is changed, it will result in the draining liquid not necessarily distributed on multiple testing elements evenly. In the embodiments of the diversion element as shown in FIG. 2, FIG. 3 and FIG. 4A, the stability of the diversion element 113 is further enhanced. If there is excessive sample, it will flow to the recessed area arranged under the sample feeding area 1121, so as to avoid excessive sample form flowing on the test strip 112. Of course, the diversion element in other shapes is used, such as "T", "L" or any type. The embodiments described above in the present invention are some preferred exemplary embodiments. Of course, if there are no recessed areas or chambers, baffles, and diversion elements, only when the liquid inlet 1117 is in fluid communication with the testing element, testing of an analyte in the sample can also be performed (FIG. 2). In order to better reduce the impact of the liquid, the first area is narrowed to only allow the diversion element to be inserted into the narrow area, one end of the diversion element 1131 almost covers the fluid inlet 1117, and the dividing plate can make the diversion element fixed at a position and reduce the impact on deformation of the diversion element; in other words, the width of the first area is equal to the thickness of the fluid element 131, thus to have the effect of fixing the fluid element.

In some embodiments, after the testing element is arranged in the groove of the carrier, and then a layer of transparent or partially transparent thin film 114 is covered on the carrier to seal the groove area of the carrier and the opening of the chamber, and the transparent thin film makes it easier to observe the test results on the final detection area. The transparent thin film may be a transparent plastic sheet, which is only transparent in the test area 1122. The thin film covers the entire carrier, and it basically keeps the testing element 112 and the chamber 1116 in a sealed space, thus, to prevent the testing element from being wet during packaging and transportation and affecting the performance of the test. In this way, when the liquid input through the guiding channel 1115 enters into the carrier, for example, entering into the chamber 1116 on the carrier, so that a certain space in the chamber or the carrier is occupied due to the entry of the liquid, the existing air is compressed, which is not favorable for smooth entry of the liquid any more. Therefore, in some embodiments, some notches 1118, 11181 are arranged at the edge of the chamber 1116, a thin film is covered on the notches to form a through hole, so that when the excess gas or air is discharged from the carrier, the air pressure in the carrier is kept the same as the outside air pressure, which is convenient for liquid to enter into the carrier easily. This will be described in detail later. In some preferred embodiments, for example, when the absorbing element 107 of the collector is inserted into the chamber of the piercing element 106, the chamber of the piercing element is in fluid communication with the chamber 1116 on the carrier, in this way, the chamber of the piercing element is communicated with the outside to keep the air pressure in the chamber of the piercing element consistent or be same or similar with the outside.

Accommodating Element

In some embodiments, if the carrier is directly connected to the absorbing element, it may be still not very convenient and safe during operation, because the operation is not performed by specially trained personnel in a professional laboratory; and the users are generally lack of testing experience and may be not friendly during sample collection or operation, and there is a risk of damaging the test strip, for example, holding the strip at a different place. The finger may press the test strip or touch the test strip, which may have a negative effect on the test strip, thereby affecting the final test result. In addition, the absorbing element needs to be inserted into the receiving device to squeeze the absorbing element, and simultaneously a force is needed to push the piercing element to move, and the liquid in the liquid chamber is released to mix with the sample and other operations, if only the carrier itself is used to complete all the operations, though it is possible, it is still not safe, and the operator must be take special care. Therefore, on the one hand, in some embodiments, the said assay device further comprises an accommodating element 110, and the receiving element comprises an accommodating chamber 1104 which is used to receive the carrier 18 with a testing element. The overall shape of the accommodating chamber is similar to that of the carrier. In a specific embodiment, the carrier of the present invention presents a cuboid, and the accommodating chamber 1104 basically presents a cuboid and it is also provided with an upper side 1102 or a back side 1107. In some embodiments, the upper side 1102 of the accommodating chamber is transparent, and the test result of the testing element on the carrier is read through the transparent part, for example, with a naked eye, or an electronic instrument such as a scanner.

Figure 8:
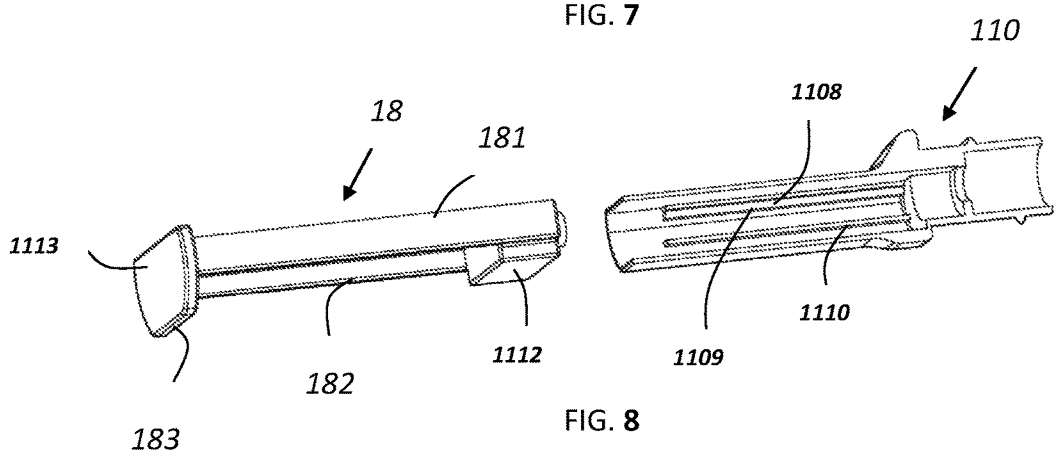
FIG. 8 depicts a three-dimensional structure diagram of a carrier being assembled in an accommodating chamber of the accommodating element according to a specific embodiment of the present invention.
Figure 9:
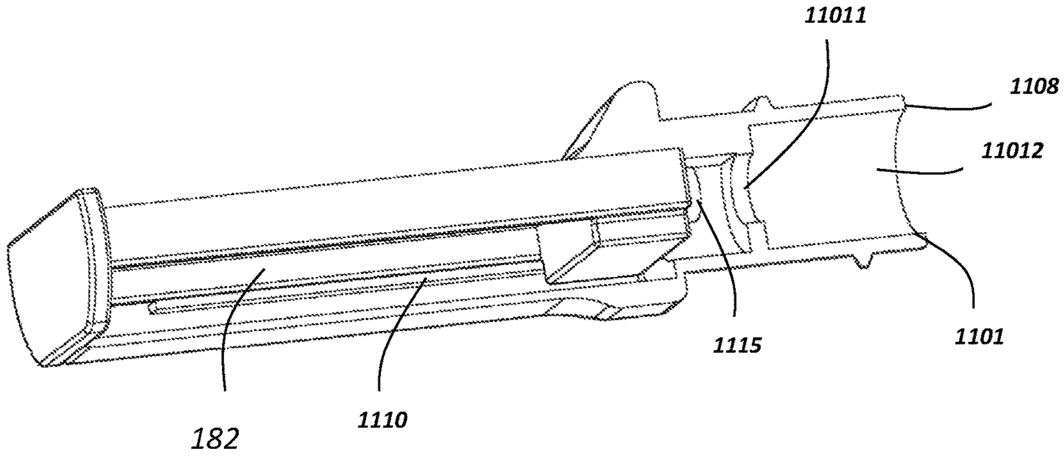
FIG. 9 depicts a three-dimensional section structure diagram after a carrier is inserted into an accommodating structure according to a specific embodiment of the present invention.

In some embodiments, the carrier is conveniently fitted or inserted into the accommodating chamber 1104, and a slide way is arranged in the accommodating chamber, the slide way is composed of two pairs of slide ways, and one pair of slide ways 45, 1110 are arranged on one side wall of the accommodating chamber, the other (not shown) is arranged on the other side wall thereof. Thus, the side faces 182, 181 on both sides of the carrier is used as slide rails. In this way, the carrier is stably or relatively fixedly installed at a fixed position in the accommodating chamber. During assembly, in order to make the upper side of the carrier (the side with a testing element) face the upper side 1102 of the accommodating chamber, a limiting structure is arranged on the carrier to prevent the upper side of the carrier from facing the lower side of the accommodating chamber 1107 during assembly. A limiting structure, for example, a stopper 1112, is arranged on the back side of the carrier, and directly under the chamber 1116 of the carrier or under the fluid inlet channel 115. The stopper 1112 is arranged between the slide rails, and the slide rails still pass through the both ends 1822 and 1811 of the stopper. Generally, it is inserted into the accommodating chamber through one end of the fluid inlet channel. The width between the slide way 45 and the slide way 1110 of the accommodating chamber is equal to or slightly larger than the thickness or the height of the carrier. Wherein, a slide way is arranged in the form of "⌈", for example, as shown in FIGS. 8 and 9, a slide way on the side wall of the accommodating chamber is designed as in such a form that one side 1109 is parallel to the side and the other side 1108 is perpendicular to the side wall of the accommodating chamber, and the other side wall of the corresponding accommodating chamber also adopts such a structure. In this way, in fact, the upper slide way 45 (actually a pair) and the slide way 1110 (also a pair, with the side walls of the other accommodating chamber not shown) of the slide way structure have different widths in the accommodating chamber, so that when the carrier is inserted into the accommodating chamber, if the front side of the carrier (the side covered by the thin film 114) faces the upper side 1102 of the accommodating chamber, the sides 1811 and 1822 of the carrier is used as a slide rail structure to contact the slide way 1110 and enter into the accommodating chamber. If the direction is opposite, the sides 1811 and 1822 of the carrier are used as a slide rail structure to contact the structure of the slide way 45, as the distance between the structures of the slide way 45 is less than the width of the carrier, the carrier cannot be inserted into the accommodating chamber, the upper side of the carrier is inserted in the direction corresponding to the upper side of the accommodating chamber, otherwise, it cannot reach the accommodating chamber. The presence of the stopper can make it easier to identify the front and back side of the carrier.

Therefore, in some preferred embodiments, the carrier 18 with a testing element is arranged in the chamber 1104 of the accommodating element, while the collector with an absorbing element 107 is directly connected to the carrier. For example, the absorbing element is a cylindrical sponge, which is absorbing element is connected to the carrier 111 through a connecting rod 109, for example, detachably connected. In some embodiments, the connecting rod 109 comprises a channel 12 or a pipe (FIG. 11), and the channel 12 is in fluid communication with the liquid inlet 1117 on the carrier 111 so that when the absorbing element 107 is compressed, the liquid sample can flow into the chamber 1106 of the carrier 111 through the pipe of the connecting rod, thus to make analysis of the analyte according to the embodiment described above. The sample collector 109 may be connected to the pipe 1115 of the carrier 18 with a liquid inlet through an end 1093 without an absorbing element to form a fluid communication. Of course, the collector can also form a fluid communication with the chamber 1104, and it may also adopt a detachable connection, and then the chamber 1104 forms a fluid communication with the connecting pipe 1115. To sum up, after the absorbing element collects a liquid sample, the fluid sample or the treatment solution mixed with the fluid sample flows onto the testing element through the channel or a flow path. The absorbing element can be detachably combined with the carrier or the chamber 110, which is convenient for the absorbing element to be separately sterilized, for example, as described in the applicant's U.S. Pat. No. 10,035,146, the absorbing element is combined with the testing element and cannot be separated, so it is not easy to treat them separately, the difficulty is increased.

In some embodiments, the stopper 1112 includes the chamber 1116 having a carrier, which is used for accommodating a fluid sample and the diversion element 113. In this way, as the grooves 1110, 1114, 11123, and 11124 that are arranged on the carrier for accommodating the testing element 1128, 1129, 1130 and 1131 are relatively shallow; while the volume of the chamber 1116 on the carrier is relatively large, it is enough to accommodate the liquid flowing in from the guiding channel. Therefore, in some embodiments, the chamber 1116 on the carrier is arranged in the stopper 1112.

In some embodiments, the opening 1103 of the accommodating chamber 1104 matches the end tail structure 183 of the carrier, which may also have a function of limiting the front and back sides. For example, if the opening 110 of the accommodating chamber is designed as "D", then the end tail structure 183 of the carrier is also designed as "D". Any other structure can also achieve the front and back side functions.

Figure 10:
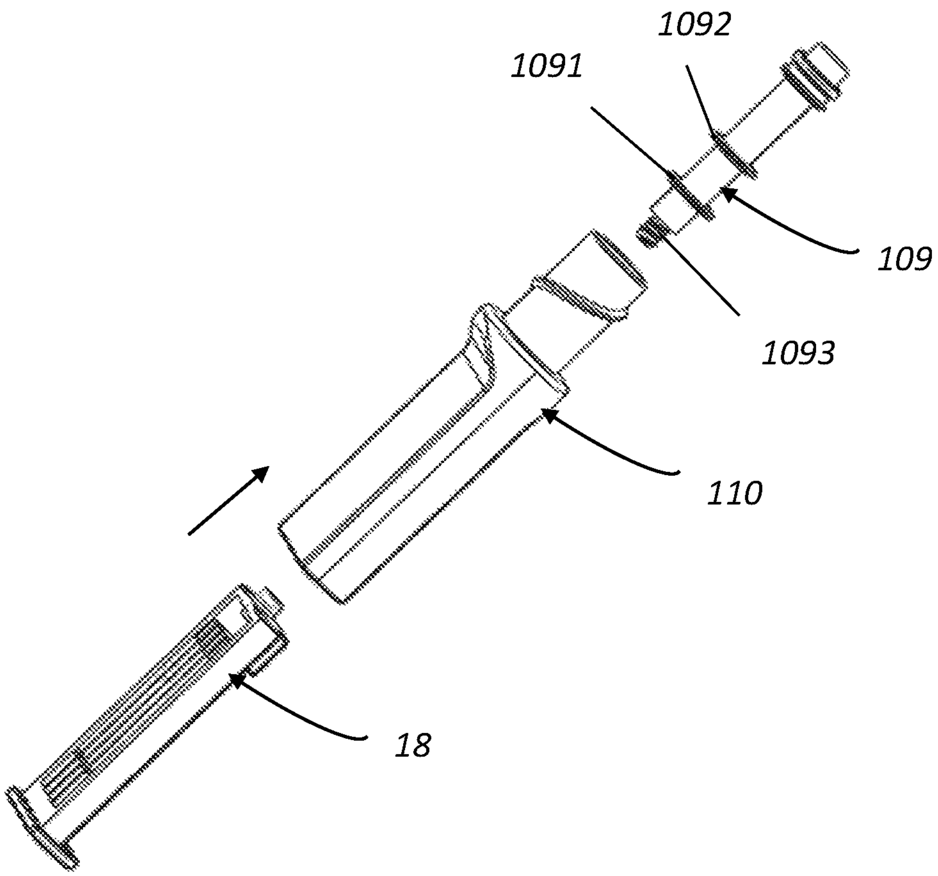
FIG. 10 depicts a decomposition structure diagram of an assay device according to a specific embodiment of the present invention.
Figure 18:
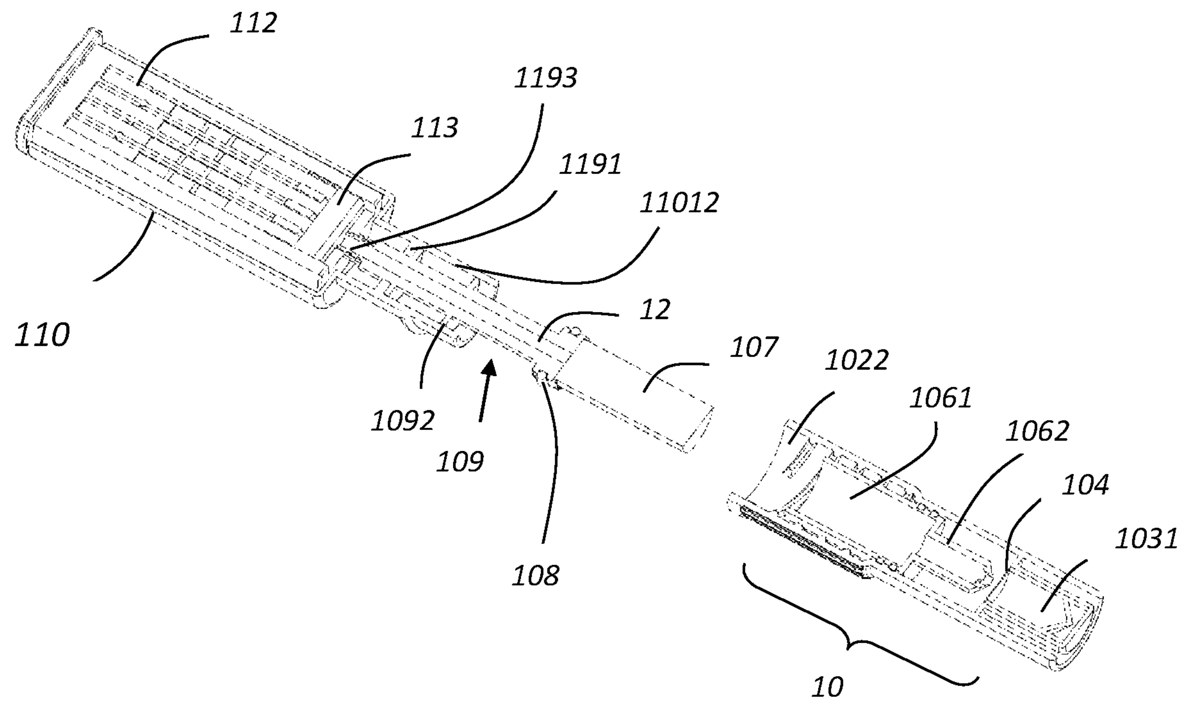
FIG. 18 depicts a section structure diagram before a testing device is inserted in front of a receiving device according to a specific embodiment of the present invention.
Figure 19:
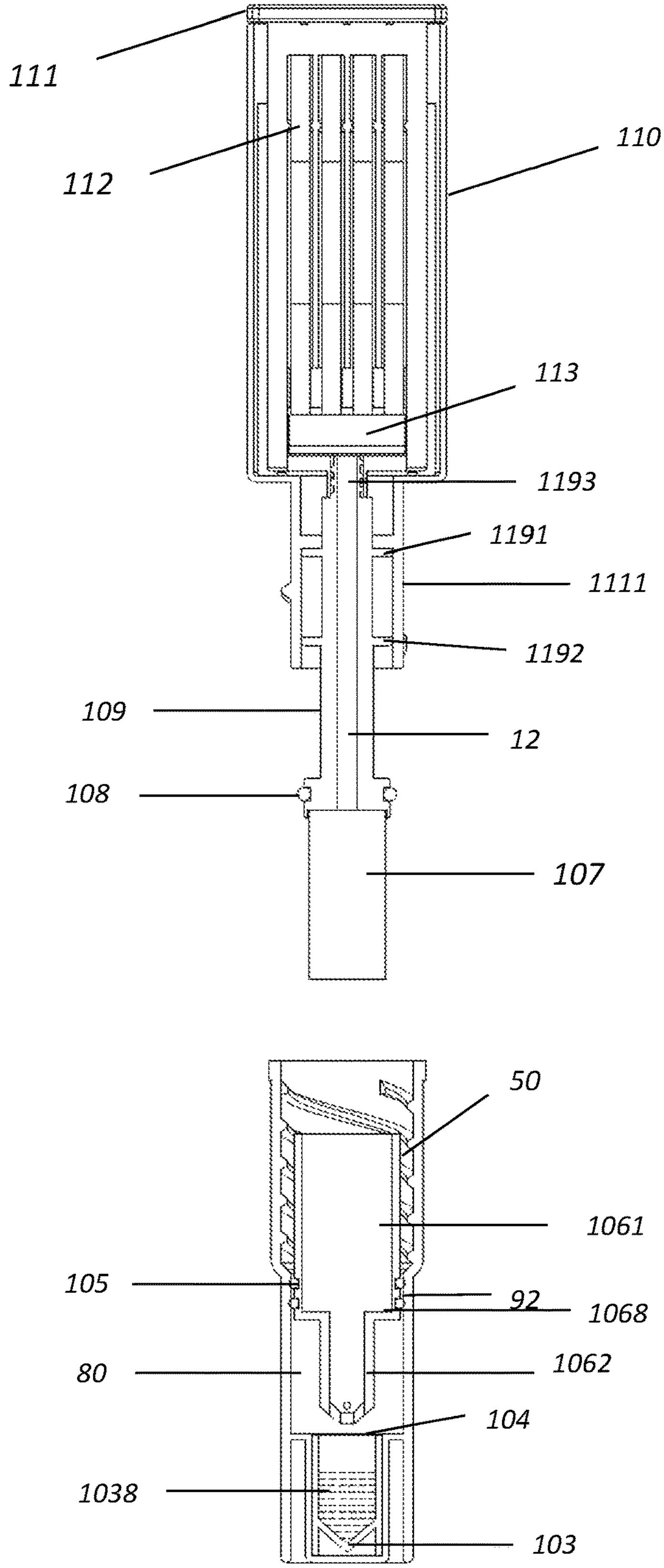
FIG. 19 depicts a section structure diagram before a testing device (an absorbing element absorbs a fluid sample) is inserted in front of a receiving device according to a specific embodiment of the present invention (containing a treatment solution).
Figure 20:
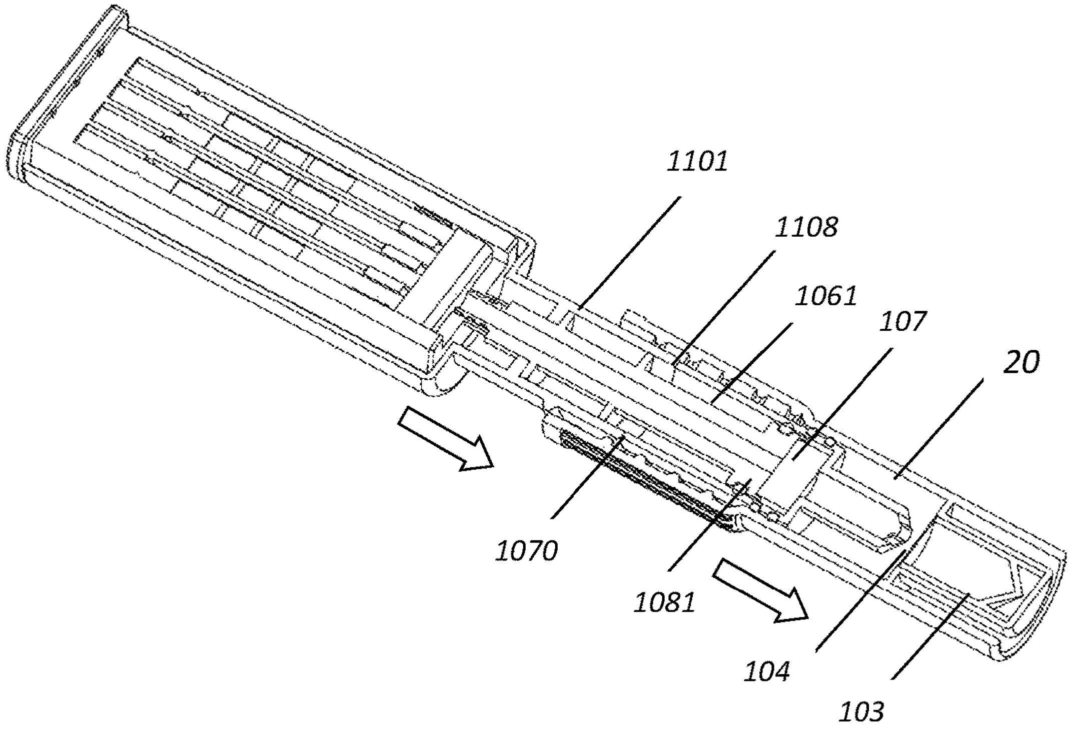
FIG. 20 depicts a section structure diagram after a testing device is inserted in a chamber of the piercing element in the receiving device and the absorbing element is squeezed according to a specific embodiment of the present invention, wherein the piercing element is arranged at a first initial position.
Figure 21:
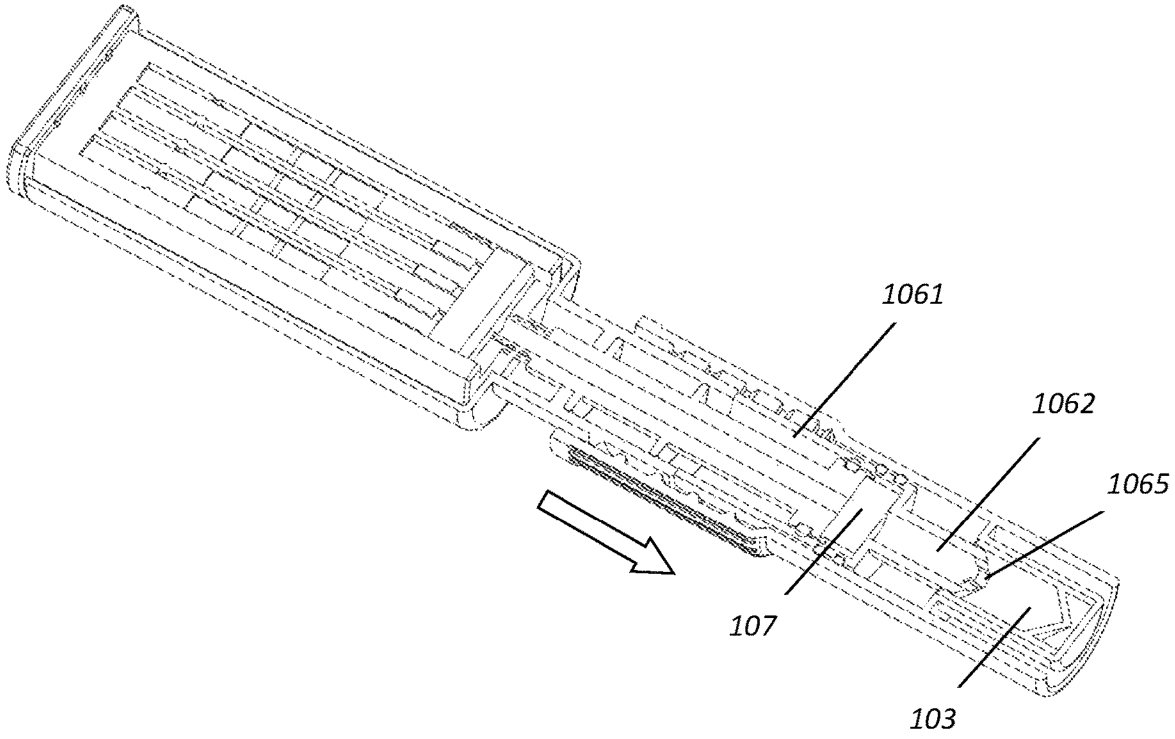
FIG. 21 depicts a section structure diagram after a testing device is inserted in a chamber of the piercing element in the receiving device and the piercing and absorbing elements are moved from a first position to a second position by a connecting element according to a specific embodiment of the present invention (the piercing element pierces the chamber containing the treatment solution and partially enters into the chamber).
Figure 22:
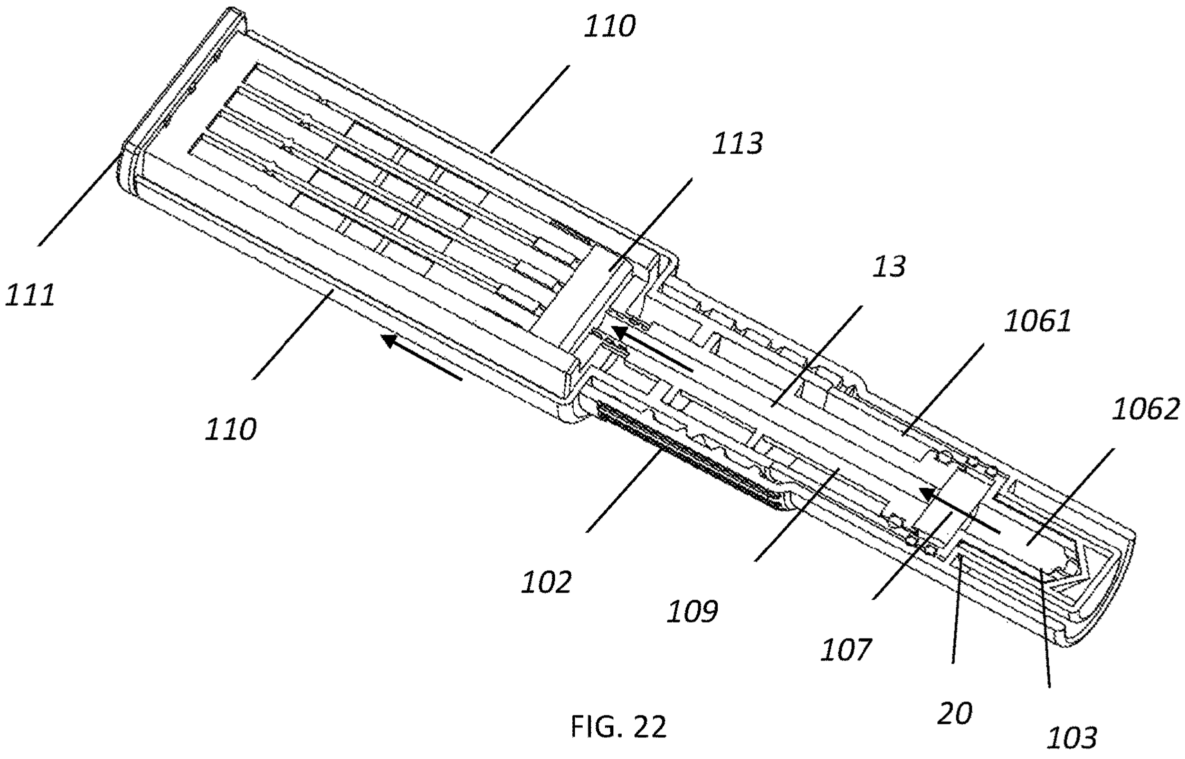
FIG. 22 depicts a section structure diagram when the piercing and absorbing elements are moved from a first position to a second position by a connecting element according to a specific embodiment of the present invention (the first chamber of the piercing structure is inserted into the chamber, and the treatment solution enters into the first chamber to mix with the fluid sample and flows into the testing element through the absorbing element).

In some embodiments, the accommodating chamber comprises a connecting element 1101, which is an extension of one end of the accommodating chamber. A hole 11011 is arranged between the accommodating chamber and the connecting element. When the carrier is inserted into the accommodating chamber, the guiding channel 1115 is located near the hole 11011, and when the connecting element 1101 is in a tubular structure, the end of the connecting rod of the collector (such as the threaded end) is inserted into the connecting element, and connected with the guiding channel 1115 through the hole 11011 (as shown in FIG. 10, FIG. 18-19). The collector comprises an absorbing element 107, used for collecting a sample, such as a fluid sample. The collector is connected to the connecting rod 109, and a channel 12 is arranged in the connecting rod (see FIG. 18). One end of the channel in the connecting rod is in fluid communication with the absorbing element, and the other end is connected to the guiding channel 1115, so that the liquid passing through the absorbing element can flow into the guiding channel through the transfer channel 12 in the connecting rod, thereby entering into the chamber 1116 of the carrier and flowing onto the testing element under the guidance of the diversion element.

In some embodiments, the connecting rod 109 comprises the bulge structures 1091, 1092, and the bulge structures are in contact with the inner wall of the connecting element 1101, which mainly ensures that the connecting rod is accurately aligned with the opening of the guiding channel 1115 and be connected. One end 1093 of the connecting rod and the guiding channel 1115 may be connected in any suitable manner, such as clamping, connection through screws, or piston connection.

Figure 11:
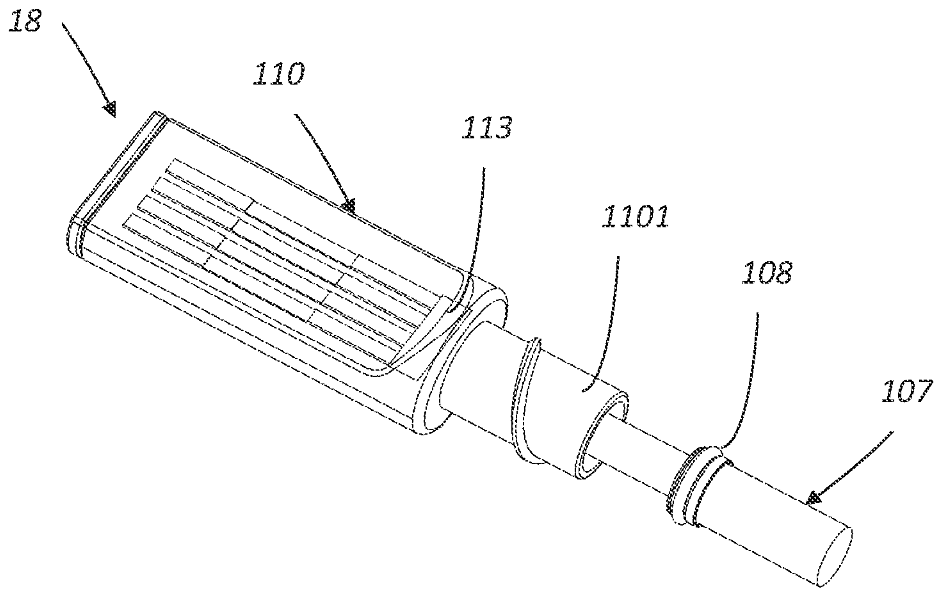
FIG. 11 depicts a structure diagram of an assay device with a collector according to a specific embodiment of the present invention.

In some embodiments, the detachable connection between the absorbing element 107 and the testing element means that at the beginning, the two elements is manufactured separately, and when needed, they are assembled for use. The main advantage is that the absorbing element needs to be sterilized before it is extended to the mouth to take a saliva sample as required, such as high-temperature sterilization and radiation sterilization. In this way, if the testing element and the absorber are connected at the beginning, the testing element is sterilized together with the absorbing element, but the testing element is treated with some chemical or biological species, which may damage the activity of the substance on the testing element, thereby making it unable to complete the correct test. For example, the testing element is treated with antibodies or antigens; high temperature sterilization may cause the antibodies to be denatured and lose its binding ability, if some substances are treated on the testing element, which may be reduced due to volatilization under high temperature, an adverse affect may also be caused to the monitoring performance of the testing element. Besides, the detachable connection method can also facilitate transportation, the carrier and the collector are packaged separately, and they are assembled together when needed. This also increases the convenience in use. When manufacturing, it is manufactured separately and then assembled separately, or each component is manufactured separately and then transported to another place for assembly together to complete the product (as shown in FIG. 10-11). FIG. 11 depicts only a preferred embodiment of the present invention, which may lack a chamber containing a carrier, lack a diversion element, or a connecting rod, etc.

Of course, in an embodiment, after the carrier 111 with a testing element 112 is assembled by an accommodating element 110, the connecting rod 109 of the collector is assembled with the carrier 111 to form a final assay device, as shown in FIG. 11. In some embodiments, fitting the bulge structures 1091, 1092 of the connecting rod with the inner wall 11012 of the connecting element 1101 can increase the strength or rigidity of the connection rod, so that when the absorbing element is used to collect a sample, it will not cause the connecting rod 109 to break. In addition, these convex annular structures can also allow the connecting rod to be arranged at the central axis of the connecting element, to make one end of the connecting rod easily aligned with the guiding channel 1115 on the carrier, thus to form a fluid communication during fitting and assembly.

In some embodiments, one end of the connecting rod connecting the absorbing element has an expanded portion, and the absorbing element is arranged on the expanded portion, and generally, the cross section of the absorbing element is larger than the cross section of the connecting rod. The expanded portion may be in a disc shape 805, and the absorbing element is glued to the surface of the disc. At this time, the channel 12 arranged in the connecting rod is connected to the absorbing element and the input channel 1115, which makes the fluid communicated with the chamber 1116 on the carrier, thereby enabling the fluid to be communicated with the testing element on the carrier. In some embodiments, an elastic seal ring 108 is arranged on the disc to keep the absorbing element 107 in a sealed chamber, thereby preventing the extruded fluid sample from flowing out.

Analyte

The embodiments of using the analytes involved in the present invention include some small molecular substances, and the small molecular substances include drugs (e.g., drug abuse). "Drug of abuse" (DOA) refers to use of drugs for non-medical purposes (usually paralyzing nerves). Abuse of these drugs can lead to physical and mental damage, causing dependence, addiction and/or death. Examples of DOA include cocaine; amphetamine (AMP) (such as black beauty, white amphetamine tablets, dexamphetamine, dextroamphetamine tablets and Beans); methamphetamine (MET) (crank, meth, crystal and speed); barbiturate (BAR) (such as Valium □, Roche Pharmaceuticals, Nutley and New Jersey); sedatives (i.e. sleeping aids); lysergic acid diethylamide (LSD); inhibitors (downers, goofballs, barbs, blue devils, yellow jackets and methaqualone); tricyclic antidepressants (TCA, i.e. imipramine, amitriptyline and doxepin); methylenedioxy-methamphetamine (MDMA); phencyclidine (PCP); tetrahydrocannabinol (THC, pot, dope, hash, weed, etc.); opiate (i.e. morphine (MOP) or opium, cocaine (COC), heroin and hydroxycodeinone); and antianxietics and sedative hypnotics, wherein antianxietics are a class of drugs mainly used for reducing anxiety, tension and fear, stabilizing mood and having hypnotic and sedative effects, including benzodiazepines (BZO), atypical BZ, fusion diazepines NB23C, benzodiazepines, BZ receptor ligands, ring opening BZ, diphenylmethane derivatives, piperazine carboxylates, piperidine carboxylates, quinazolinones, thiazines and thiazole derivatives, other heterocyclics, imidazole sedatives/paregorics (such as oxycodone (OXY) and methadone (MTD)), propylene glycol derivatives-carbamates, aliphatic compounds, anthracene derivatives, etc. The assay device of the present invention can also be used for detecting drugs that belong to medical use but are prone to overdose, such as tricyclic antidepressants (imipramine or the like) and acetaminophen. After being absorbed by the human body, these drugs will be decomposed into small molecule substances which are present in body fluids such as blood, urine, saliva, sweat or part of the body fluids.

For example, the analytes detected by the present invention includes but not limited to, creatinine, bilirubin, nitrite, protein (non-specific), hormone (e.g. human chorionic gonadotropin, progesterone hormone, follicle stimulating hormone, etc.), blood, white blood cell, sugar, heavy metals or toxins, bacterial substance (e.g. proteins or sugars against specific bacteria, such as *Escherichia coli* 0157: H7, staphylococci, *salmonella, clostridium, campylobacter, L. monocytogenes, vibrio*, or *cactus*) and substances related to physical characteristics in urine sample, such as pH and specific gravity. Any other clinical chemical analysis of a urine is detected by combination of a lateral cross-flow detection method and the device of the invention.

In some embodiments, the treatment solution contained in the receiving device does not include the analyte.

Flow of a Liquid

The flow of a liquid normally refers to the flow from one place to another. Generally, the flow of a liquid in nature mostly flows from high to low by the action of gravity; the flow here also depends on an external force, i.e. flow under the actions of an external gravity, so it is called a flow under natural gravity. In addition to gravity, the flow of a liquid can also overcome the action of gravity, so that the flow is from low to high. For example, a liquid is extracted or compressed, or a liquid receives a pressure and then flows from low to high, or flows against the gravity of the liquid itself because of the effect of the pressure. For example, in FIGS. 9, 19, 22, and 27, the first chamber is arranged above the second chamber and the second chamber is arranged below the first chamber; when a liquid enters into the second chamber, the liquid can flow naturally from the first chamber to the second chamber under the effect of its gravity, and may also flow from the upstream to the downstream position naturally.

Assay Device

The assay device refers to a device for detecting the presence of an analyte in a sample. A receiving device refers to a part of a receiving and assay device or inserting a part of the assay device into the receiving device, thus, to complete mixing or treating a sample, eluting the absorbing element, treating the liquid or liquid sample. The receiving device does not exist specifically for receiving an assay device, it can exist alone, and it can exist alone to treat the fluid sample. The assay device may comprise a testing element having a test function, or a carrier with a testing element, or may further comprise a receiving element of the carrier. The assay device may include an absorbing element for collecting a sample, or an absorbing element with a connecting rod. The absorbing element with a collected sample can also be called a collecting device or a collector, so the collecting device may also comprise an assay device, or the collecting device and the assay device are separated, and the collecting device and the assay device are combined during a detection, thus to complete a detection; wherein the assay device may further comprise a collecting device. Optionally, the collecting device and the assay device are of an integrated structure, once the liquid sample is collected, the detection is performed immediately to obtain the test result. The meaning of the assay device or the testing element herein is interchanged.

The "receiving device" herein is only for the convenience of description, in a specific embodiment, the receiving device receives a part of the collector, for example, a receiving device, or a part of an assay device with an absorbing element. When the receiving device is not intended for a receiving function, it may also be called a sample treatment and sample mixing device; when the sample treatment is conducted, a receiving assay device may not be required, and only a receiving absorbing element alone can independently complete the process (see below for details). In short, "receiving" herein may not limit the scope of the device, nor have a constraint in the Claims' requirements according to any patent law; it is just a name for the convenience of description.

Assembly, Combination or Fitting of a Collecting Device and an Assay Device

Figure 12:
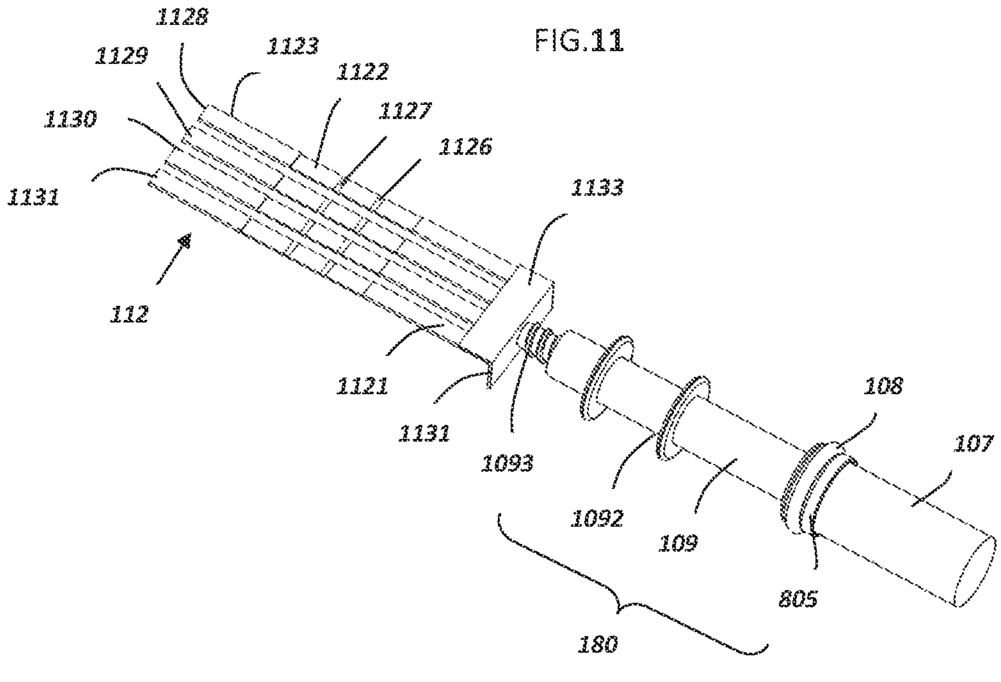
FIG. 12 depicts a structure diagram of a collector when fitting with a testing element and a diversion element according to a specific embodiment of the present invention.
Figure 13:
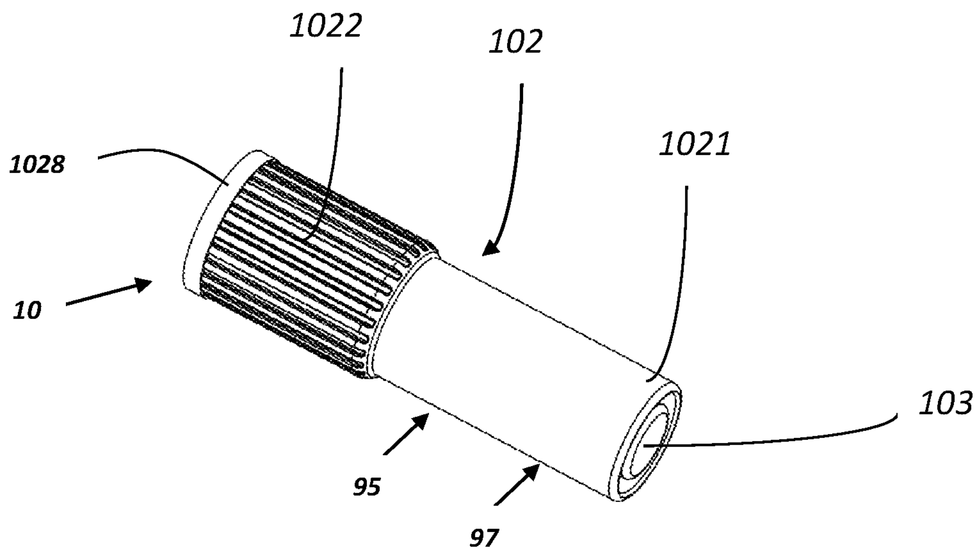
FIG. 13 depicts a three-dimensional structure diagram of a receiving device or a receiving cup according to a specific embodiment of the present invention.

The assay device and the collecting device or collector of the present invention can form a detachable combination, before liquid collection as required, the assay device has been combined with the collecting device; after collection of a liquid sample is completed, the absorbing element on the collecting device is compressed, and the liquid sample enters into the testing element for the testing. Of course, the collecting device and the assay device is separated at the beginning; and combined when it is needed to collect a liquid sample, after the collection is completed, the absorbing element is compressed, and the liquid sample enters into the testing element for the testing. In some specific embodiments of the present invention, according to a specific embodiment shown in FIG. 12, the present invention provides an assay device for detecting the presence of an analyte in a liquid sample, or a collecting device for collecting a liquid sample (the absorbing element 107 and the connecting rod 109 are combined to form a collecting device or collector), which comprises a detection component and a collection component, wherein the detection component has a testing element 112, and the collection component has an absorbing element 107, the detection component and the absorption component are detachably combined, connected or assembled.

"Combination, connection or assembly" herein actually has the same meaning, the words used are different, but they all mean to combine together, and this combination is opposite to "separation". Combination and separation are under any conditions, which is freely selected. In some embodiments, when the detection component and the collection component are combined together, the detection component and the collection component are in a state of fluid communication. In other embodiments, when the detection component and the collection component are being separated or before or after separation, the detection component and the collection component are not necessarily in a state of fluid communication.

In some embodiments, the absorbing element 107 is arranged on a connecting rod 109 to form a collector or collecting device, and the absorbing element 107 can absorb a fluid sample, such as saliva, urine, or blood. One end of the connecting rod 109 is connected to the absorbing element 107, and the other end thereof is connected to a connecting pipe or an input channel 1115 of the carrier 111, the connection is made through threads or clips, or by locking, or the connection is achieved by bolts and jacks, which is used for connection or disassembly. In this way, when it is required to sterilize the absorbing element or absorb it separately, sterilization treatment is conducted separately by the following methods, including high temperature, X-ray, radiation sterilization, nuclear radiation sterilization, etc. After the sterilization is completed, it will be assembled with the carrier by a method, for example, as shown in FIGS. 10-11.

Receiving Device

In some preferred embodiments, the present invention further provides a receiving device used for receiving a part of the assay device, so that the sample on the absorbing element is treated or subjected to a treatment process before the formal test. Or, in another aspect, the present invention provides a device for preprocessing a sample, the device is not only for receiving the assay device, but also for treating the sample before the assay device starts a sample detection; the device can exist independently of the assay device, and also function independently of the sample collector, only in some specific embodiments, it is used in combination with the assay device or the sample collector. As explained above, and referring to the descriptions below; the receiving device is merely a name for the convenience of description, it does not have a substantial definition, and it is called a device, a processor, a system, etc.

Figure 14:
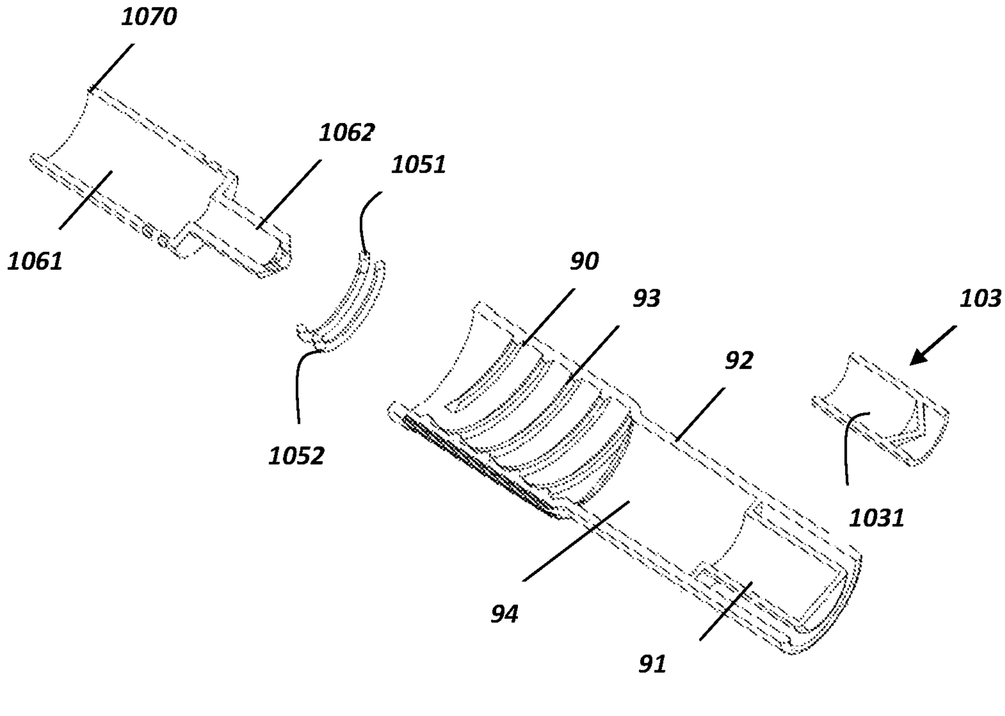
FIG. 14 depicts a three-dimensional profile diagram of all parts of a receiving device or a receiving cup according to a specific embodiment of the present invention.
Figure 15:
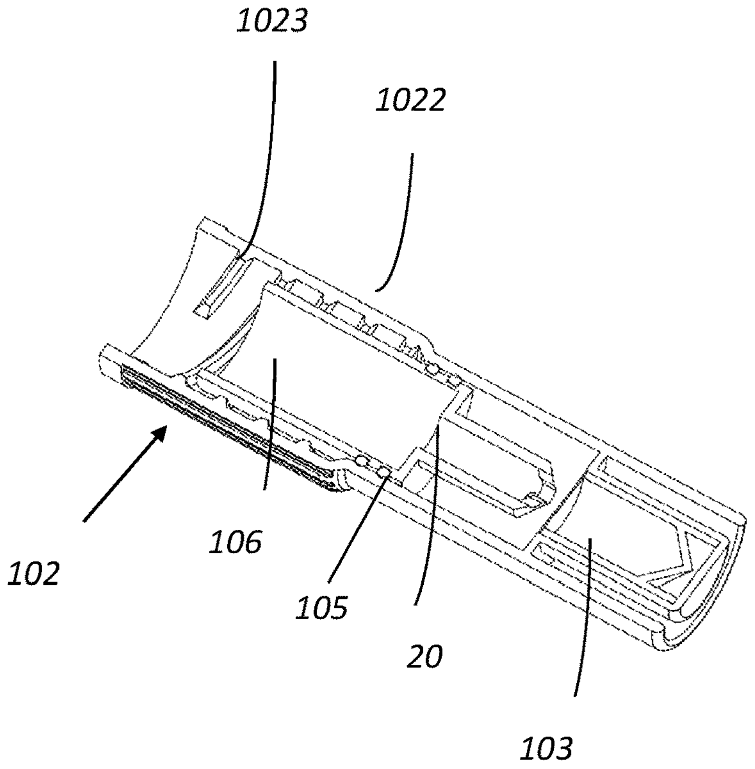
FIG. 15 depicts a three-dimensional structure profile of a receiving device or a receiving cup according to a specific embodiment of the present invention.

As shown in FIGS. 13-17, in an embodiment, the device comprises a chamber structure, which is similar to a cup or tube construction. In some embodiments, the receiving device comprises a chamber 91 for containing the treatment solution and a chamber 94 for receiving a partial piercing element. The receiving device may be provided with an opening end and an closed end to form a space or a chamber 102, a plurality of small chambers with different functions are distributed in the large chamber, for example, a first chamber 91 for containing the treatment solution and a second chamber for containing or accommodating a partial piercing element. For example, a space or chamber 91 is arranged at the bottom of the chamber 102 of the receiving device, for accommodating a sealed container 103, the container contains a treatment solution, and the treatment solution may contain some chemical, biological reagents, enzyme preparations, PH adjustment reagents, buffer reagents, proteins, inorganic or organic reagents, the liquid solution is used to treat a fluid sample or treat an absorbing element or treat a sample, such as removing impurities in the sample, removing interfering substances in the test, or dissolving or diluting the sample, or eluting or dissolving the absorbing element, or adjusting the pH valve of the sample. Generally, the treatment solution described in the present invention does not contain an analyte, but it is intended to improve the detection sensitivity of the analyte, so as to treat the sample, remove or eliminate, or reduce the interfering substances or other impurities in the analyte testing. The sealed container 103 has a sealed chamber 1031 and the chamber is used for storing a treatment solution. In order to facilitate the treatment solution to release easily, the container is easily pierced by the piercing element; hence, in some embodiments, the sealed chamber is sealed by a material 104 that is easily pierced, such as aluminum foils, thin films, tapes, or plastic sheets. In this way, the entire sealed container is arranged in the first chamber 91 (as shown in FIG. 14), and a sealed chamber 103 is separately arranged in the first chamber 91 to facilitate processing. The container is prefilled with the treatment solution, and then the container opening is sealed (shown in FIG. 14) with the material 104. Of course, it is allowed to arrange a sealed space at the bottom of the chamber of the receiving device, and inject the treatment solution into the space, and then seal the space, for example, there is a chamber 91 at the bottom of the device, and the chamber contains the treatment solution, and then the opening of the chamber is sealed, and the sealing material may be the material easily be pierced by the solution. In any case, the sealed space is generally arranged in the chamber 102, and the sealed space is prefilled with solution for treating the sample; when necessary; the solution for treating the sample is released from the sealed space.

In some other embodiments, the chamber 102 of the receiving device further comprises a piercing element 106 that can be movable, the piercing element 106 can be movable in the receiving device, and the chamber containing the treatment solution is pierced by the movement to release the treatment solution. In some embodiments, the piercing element comprises a piercing structure 1066, and chamber that is used to receive the treatment solution, i.e. the treatment solution from the first chamber of the receiving device. Therefore, after movement of the piercing element pierces the chamber containing the treatment solution, the released treatment solution enters into the chamber of the piercing element. The chamber of the piercing element can also be used to receive a sample, such as a liquid sample, or an absorbing element with a liquid sample. In this way, the sample is treated in the chamber of the piercing element to form a first mixed solution, and the treated mixed solution is used for detecting an analyte, and the testing element is used for the detection. In some embodiments, the collector 180 with an absorbing element is inserted into the chamber of the piercing element, at this time the piercing element is at the first position (if shown in 15), and the piercing structure 1066 is above the position containing the treatment solution, when the collector is inserted into the chamber and; compressed the absorbing element will be compressed, a pressure has to be applied to the absorbing element, for example, applying a pressure to the absorbing element through a connecting rod, and the applied pressure can also simultaneously push the piercing element to move from the first position to the second position, thus to make the piercing structure pierce the sealed thin film on the chamber containing the treatment solution; then, if the piercing element is moved further, a part of the chamber enters into the chamber containing the treatment solution, and a part of the treatment solution is forced to enter into the chamber of the piercing element, for example, a small hole 1065 is arranged at the piercing structure, the treatment solution enters into the chamber through the small hole 1065 and contact with the absorbing element in the chamber, treat the absorbing element and mix to form a first mixed solution. Because the connecting rod has a channel that connects with the absorbing element, when the mixed solution formed during the process of a partial chamber's entering into the chamber containing the treatment solution, the partial chamber of the piercing element makes the treatment solution under a pressure, the pressure can allow the treatment solution or the first mixed solution formed with the sample to pass through the absorbing element and flow into the channel of the connecting rod, and thus to flow out of the receiving device through the channel 12. In order to allow more liquid to flow into the connecting rod channel, the absorbing element is used to seal the opening 1028 at one end of the chamber in the piercing element, this is just the time to make the absorbing element fill the entire chamber or seal one end of the chamber, after the partial chamber of the piercing element enters into the chamber containing the treatment solution, more of the liquid or mixed solution will enter into the channel of the connecting rod to flow out of the piercing element.

In some embodiments, the mixed solution flowing outside of the outlet channel 12 is directly used for detection by the testing element, and it can also be collected in another container, dropped into a dropper, and then the mixed solution is added by dropping to the sample feeding area to complete testing of an analyte.

The piercing element has a piercing end, and one or more piercing members 1066 are arranged on the piercing end, there is one or more piercing members, and they are used to pierce the thin film containing the treatment solution, thus, to release the treatment solution. In some embodiments, a through-hole 1065 is arranged near the piercing structure, and it is expected that after the piercing structure pierces the sealed chamber containing the treatment solution, the through-hole can come into contact with the liquid, or the through-hole is penetrated into the treatment solution for the treatment solution to easily enter into the chamber of the piercing element through the through-hole 1065.

Figure 16:
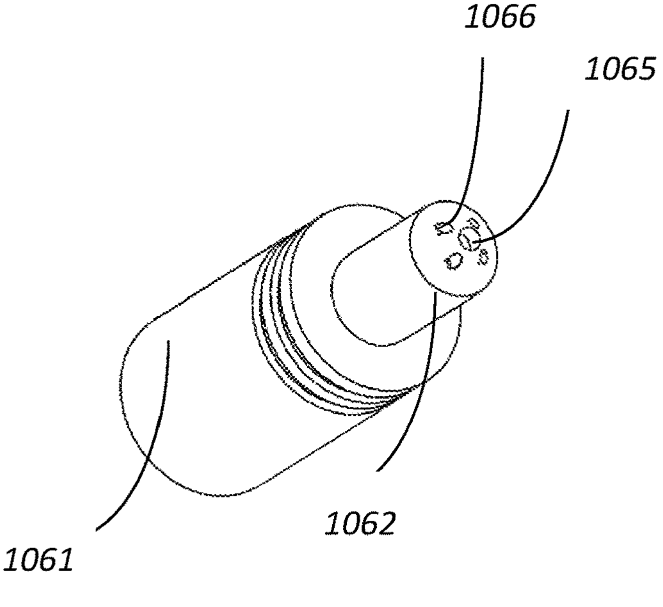
FIG. 16 depicts a three-dimensional structure diagram of a piercing element with a chamber according to a specific embodiment of the present invention.

In one embodiment, the piercing element is also of a tube structure, comprising a first tube body and a second tube body, and the piercing member is arranged at an tail end of the first tube body, for example, as shown in FIG. 16, the piercing structure 1066 is evenly distributed outside the first tube body. A first chamber 1062 and a second chamber 1061 are respectively arranged in the first tube and the second tube herein, a small hole 1065 is arranged at the tail end of the first chamber containing a piercing structure, so that when the tail end of the first chamber approaches the sealed chamber 91 or 103 containing the treatment solution, it pierces the sealing structure, and the first chamber enters into the sealed chamber 91 or the sealed chamber 103, and relying on the drainage capacity of the first chamber, the treatment solution enters into the first chamber 1062 through the small hole, this is because after being pierced by the piercing structure, if the first chamber enters to the sealing chamber, it must release a part of liquid, and the part of liquid easily enters into the first chamber 1062 of the piercing element through the through-hole 1065. In some embodiments, the piercing element moves downward to puncture the sealed chamber containing the treatment solution, and the movement of the piercing element is achieved by applying a pressure to the collector. Of course, in other embodiments, the connecting element on the accommodating carrier contacts with the piercing element, thus, to push the piercing element to move.

In an embodiment, the inner diameter of the first chamber 1062 is smaller than the inner diameter of the second chamber 1061, and there is a platform structure 1068 arranged at the junction of the two chambers. The first chamber and the second chamber form a chamber structure in liquid connection. When the piercing structure 1066 pierces the chamber 103 containing a treatment solution, a part of the treatment solution is allowed to enter into the chamber of the piercing element through the through-hole 1065, for example, the first chamber 1062 or the second chamber 1061. In some embodiments, the outer diameter of the first chamber 1062 is equivalent to the inner diameter of the tube 103 containing the treatment solution, so that when the piercing member pierces the thin film, the first chamber 1062 is inserted into the tube 103 containing the treatment solution, since the internal diameter of the first tube is equal to the tube 103 containing the treatment solution, the treatment solution in the tube 103 containing the treatment solution is forced to enter into the first chamber 1062 through the through-hole 1065.

In some embodiments, since the inner diameter of the first chamber 1062 is smaller than the inner diameter of the second chamber 1061, and a platform 1068 is arranged at the junction of the two tubes, and the platform is used to contact the absorbing element and to compress the absorbing element to extrude the liquid sample out, and the extruded liquid sample flows into the first chamber 1062. In some embodiments, the inner diameter of the second chamber is equivalent to the diameter of the absorbing element, when the absorbing element is inserted into the second chamber, the absorbing element almost blocks the opening of the second chamber during the extrusion process, for example, extruding by the platform, is also equivalent to sealing or blocking the second chamber and the hole 20 of the second chamber, and simultaneously, the first chamber receives the fluid sample compressed by the absorbing element. When the first chamber pierces the chamber 103 containing the treatment solution and enters into the chamber 103, the discharged treatment solution enters into the first chamber 1062 of the piercing element, it can mix with the sample to achieve the purpose of treating the sample, thus to form a first mixed solution; simultaneously, the first chamber of the piercing element is almost a sealed space (liquid sealing for the small hole 1065); with entry of the treatment solution, the pressure in the space increases, which will force the mixed solution to pass through the absorbing element (the absorbing element has a clearance), so that the absorbing element is eluted (for example, an analyte is adsorbed, such as THC) to form a second mixed solution, the second mixed solution enters into the carrier through the channel of the connecting rod. Here, squeezing of the absorbing element releases the fluid sample into the first chamber of the piercing element and the piercing structure pierces the sealed chamber to release the treatment solution, it is not necessary to distinguish the order in terms of operation time, the two operations can be done simultaneously, or squeezing the absorbing element to release the fluid sample is earlier than the piercing action, of course, it is also acceptable if the piercing action is earlier than compressing the absorbing element. In other embodiments, the piercing element does not have a second chamber but only comprises a first chamber, the absorbing element may be inserted into the first chamber 1062, and the absorbing element may or may not be squeezed, and then, the treatment solution is directly pass through or contracting to the absorbing element so as to form a mixed solution, and it is feasible to use the mixed solution for testing.

In some embodiments, the absorbing element is bonded to the disc structure 805, the outer diameter of the disc structure is equivalent to the inner diameter of the second chamber 1061, so that when the absorbing element is inserted into the second chamber 1061, as the equivalent inner diameter of the chamber and the outer diameter of the disc are matched, when compressing the absorption component, the liquid may not flow out through the gap between the disc structure and the inner wall 1067 of the second chamber 1061, if the liquid flows out, it can only flow out through the transmission channel 12 that is in liquid connection with the absorbing element. Preferably, the disc structure has an elastic seal ring 108, a sealed structure is formed based on the elastic sealing ring and the inner wall 1067 of the second chamber 1061, so as to further ensure that when the absorbing element contacts with the platform 1068 and is compressed, more fluid sample enters into the first chamber 1062, and also guarantees that when the mixed solution in the first chamber flows back to the absorbing element, more solution will flow out through the channel 12 communicating with the absorbing element. Sealing of the disc also prevents the fluid sample or the mixed solution formed by mixing with the treatment solution from flowing out of the piercing element, thereby causing environmental pollution, also without causing pollution to the operator.

In some embodiments, squeezing the absorbing element 107 and piercing the chamber 103 containing the treatment solution is completed simultaneously, it means that it is continuous in time, in the squeezing process, the sealed chamber 103 is sealed or in piercing the sealed chamber, the compressing or squeezing of the absorbing element is included. In some embodiments, the piercing element 10 and the chamber 103 containing the treatment solution are arranged in a relative position, and the piercing structure 1066 is arranged above the sealed thin film 104 (see FIG. 15). At this time, the piercing structure 1066 may contact the sealed thin film, or be arranged at an upper position of the sealed thin film (without contacting the thin film 104), or may be a position directly above (for example, the positional relationship as shown in FIG. 19). In some embodiments, the receiving device comprises a first chamber 91 for accommodating the sealed chamber 103, and a second chamber 94 and/or a third chamber 90 for accommodating a partial piercing element, the second chamber 1061 of the said piercing element is arranged in the third chamber 90 of the receiving device, and the first chamber 1062 of the piercing element is arranged in the second chamber 94 of the receiving device. An internal thread structure 1023 is arranged between near the opening of the receiving device and the second chamber of the piercing element, and an external thread structure 1105 is arranged on the outer surface of the connecting element 1101 of the assay device. During operation, firstly, the absorbing element 107 is used to absorb a liquid sample, such as urine, saliva, or blood, at this time, the absorbing element absorbs the liquid sample, and then is inserted into the chamber of the receiving device 101, in the process of inserting, the absorbing element enters into the second chamber 1061 of the piercing element; when the absorbing element 107 contacts the platform 1068 between the first chamber and the second chamber, under an opposite force the absorbing element 107 is compressed, so that the liquid sample released from the absorbing element flows into the first chamber 1062. At this time, because the absorbing element generally become soft after absorbing a liquid, when compressing, though the position of the piercing element may be changed, for example a slight movement, the downward force at this time can also make the piercing element pierce the sealed thin film 104. As the accommodating chamber 110 of the assay device continues to move downward and enters into the opening of the receiving device, the port 1108 of the connecting element contacts the opening 1070 of the second chamber of the piercing element, then the external thread 1105 of the connecting element and the internal thread of the opening of the chamber 90 intersects with 1023, and at this time, the piercing element 10 is basically at the initial position. As the accommodating chamber 110 moves downward and rotates relatively, for example, the outer thread 1105 of the connecting element continues to intersect with the inner wall thread 1023 of the third chamber of the receiving device, the port 1108 of the connecting element and the opening 1070 of the second chamber of the piercing element contacts the transmitted power, which drives the whole piercing element move downward, and at this time the position of the absorbing element and the piercing element relatively remains fixed. As the piercing element moves downward, the sealed thin film is pierced so that a part of the treatment solution in the chamber containing the treatment solution enters into the first chamber through the through-hole 1065 at the end of the first chamber 1062. If the first chamber 1062 contains a liquid sample, such as a saliva sample, the treatment solution will mix with the liquid sample to form a first mixed solution. As the piercing element continues to move, the mixed solution passes through the absorbing element where some analyte substances adsorbed is eluted, including THC, then the solution flows into the channel 12 of the connecting rod 109 and enters into the carrier 111 to contact with the test strip 112, thus to complete the testing or assaying of an analyte (if the fluid sample contains the analyte).

The above description that the absorbing element is inserted into the chamber of the piercing element of the receiving device is easy to understand, it also allows the receiving device to get close to the collector containing the absorbing element, so that the absorbing element enters into the chamber of the piercing element, or the collector containing the absorbing element and the receiving device approach to each other simultaneously, thus to make the absorbing element enter into the chamber of the piercing element. The embodiments are all possible and are included in the scope of the present invention.

It is understood that a little liquid sample is absorbed by the absorbing element 107, or the connecting rod 109 is rigid enough or longer, when the carrier 110 of the receiving accommodating element drives the absorbing element 107 to be inserted to the second chamber 1061 of the first piercing element, with the liquid sample being extruded out of the absorbing element, the first chamber 1062 of the piercing element is driven to approach the sealed thin film and pierce the sealed thin film of the chamber with the treatment solution. At this time, the receiving element of the carrier 110 continues to drive the absorbing element 107 to be inserted into the second chamber 1061 of the piercing element and continues to be compressed, at this time, the entire piercing element also continues to move downward, and a part of the first chamber 1062 enters into the chamber 103 containing the treatment solution, a part of the treatment solution is forced to flow into the first chamber through the through-hole at the tail end of the first chamber, thereby forming a first mixed solution in the first chamber. Then, the first mixed solution forms the second mixed solution after passing through the absorbing element, enters into the channel 12 of the connecting rod 109, and then arrives at the carrier and contacts with the diversion element 113, and thereby flowing into the test strip through the diversion element 113 to complete the detection.

In some embodiments, since the testing device is mainly used for roadside detection, such as drugged driving, or in public places, it is desired to obtain the test results easily and quickly while ensuring the liquid sample cannot leak out. In order to quickly obtain the test result, it is desired that the liquid sample or the treatment body fluid quickly passes through the absorbing element and quickly enters into the carrier and contacts with the testing element. The treatment liquid or liquid sample, or the mixed solution of the liquid sample and the treatment solution; or the treatment solution is made pass through the absorbing element directly (when the absorbing element is not compressed) through the absorbing element, or enter into the carrier to contact with the testing element without passing through the absorbing element; further when the absorbing element is inserted vertically into the chamber of the piercing element, the liquid sample can move or flow quickly in the direction opposite to the direction of gravity against the action of gravity. In addition, if the absorbing element is compressed, it is also necessary to overcome the resistance of the compressed absorbing element and make the liquid enter into the channel of the connecting rod through the absorbing element, or, in order to prevent the liquid in the second chamber and the first chamber of the receiving device from leaking to the outside, thereby causing an environmental pollution.

In order to better meet one or more of the said objectives, in some embodiments, the piercing element 106 forms a sealed space in the chamber of the receiving device, and the air or gas in the sealed space is compressed, during the compression, the pressure in the sealed space increases, the increased pressure can overcome the gravity of the mixed solution, or can promote the solution to quickly enter into the chamber of the piercing element, or can pass through the absorbing element against the resistance to the liquid caused by the compressed absorbing element. In some embodiments, the first chamber of the piercing element is arranged in the second chamber 94 of the receiving device, and the elastic seal ring 105 of the piercing element fits with the inner wall of the second chamber 94 of the receiving device, thus to form a sealed space. The sealed space can only communicate with the outside through the small hole of the first chamber of the piercing element. When the hole 1065 at the tail end of the first chamber of the piercing element is inserted into the chamber containing the treatment solution, the small hole is sealed by the treatment solution, if the air in the second chamber 94 of the receiving device is compressed, the pressure increases, and there is a pressure difference between the pressure in the second chamber and the first chamber in the piercing element (as the embodiment said above, the first chamber can maintain pressure balance with the outside); in order to keep balanced the pressure in the second chamber and the external pressure of the first chamber in the piercing element, the increased pressure will force the treatment solution to enter into the first chamber of the piercing element through the hole 1065. With the piercing element continuously moving, the volume of the second chamber 94 of the receiving device is continuously compressed, and the pressure continues to increase, the treatment solution entering into the piercing element and the liquid sample squeezed and released from the absorbing element continuously pass through the compressed absorbing element to enter into the channel of the connecting rod against the gravity.

In some embodiments, in order to avoid the absorbing element from being inserted into the chamber of the piercing element and the squeezed liquid sample from flowing to the outside and causing pollution, an elastic seal ring is also provided for the absorbing element, and the elastic seal ring and the inner wall of the piercing element form a seal so that liquid squeezed from the absorbing element cannot flow out to the outside.

Figure 23:
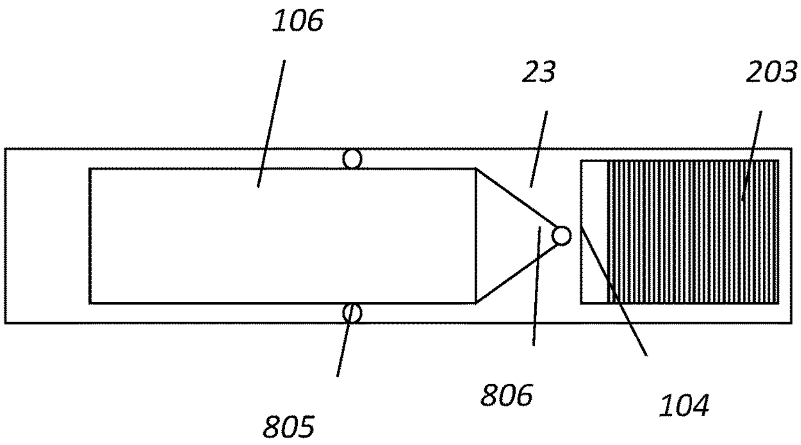
FIG. 23 depicts a structure schematic diagram according to a specific embodiment of the present invention (a moving element is at its initial position).
Figure 24:
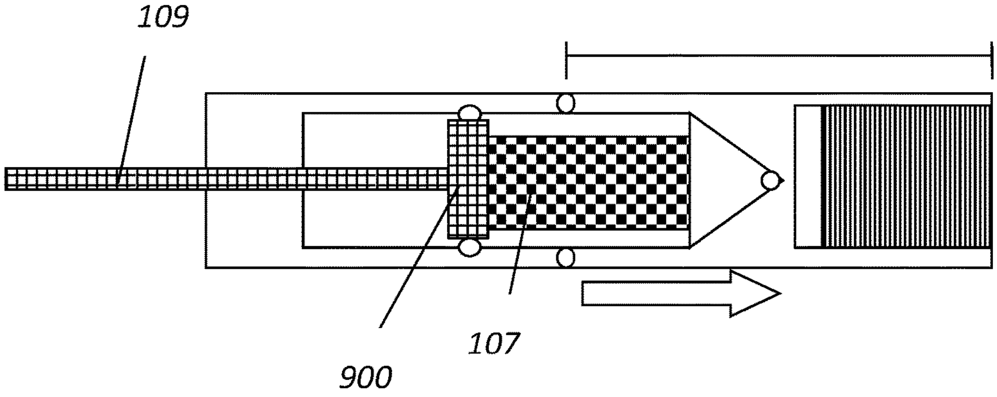
FIG. 24 depicts a structure schematic diagram according to a specific embodiment of the present invention (a moving element moves, and the air pressure in the sealed space increases)
Figure 25:
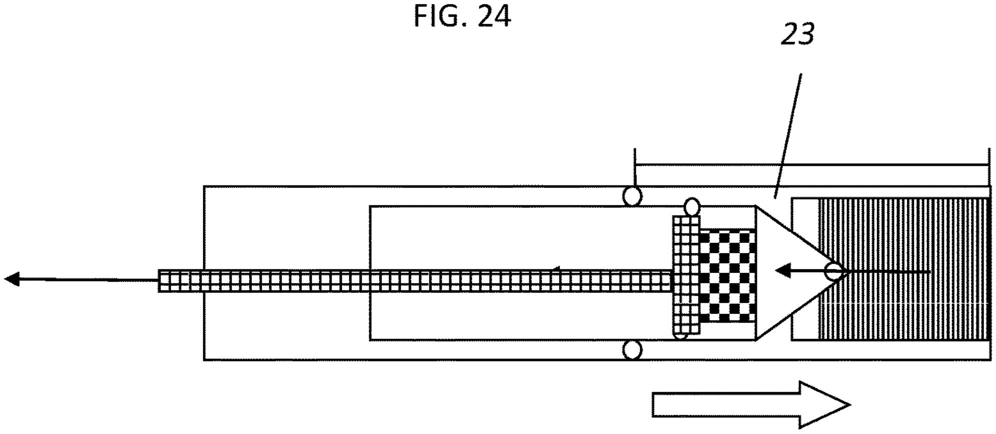
FIG. 25 depicts a structure schematic diagram according to a specific embodiment of the present invention (the solution flows out)

As shown in the schematic structural diagrams of FIGS. 23-25, in some embodiments, the piercing element 206 forms a sealed chamber 23 above the chamber 203 containing the treatment solution, and the chamber contains air or gas. The piercing element comprises a first chamber 806 and a hole at the tail end as well as a piercing structure, and it may further comprise a second chamber used for receiving an absorbing element, and the second chamber is used for receiving the absorbing element 107. It is understood that the piercing element does not necessarily need a second chamber to receive the absorbing element. The sealed space 23 is formed and is compressed, once it is compressed, the pressure in the sealed space will increase, and the increased pressure will force the treatment solution in the chamber 203 containing the treatment solution to quickly flow into the first chamber of the piercing element. In this way, the piercing element generally enters into the chamber 203 containing the treatment solution (and it may not enter, but only the through-hole contacts the treatment solution or the treatment solution seals the through-hole), the piercing element in the chamber 203 will have a drainage pressure on the liquid, and this drainage pressure will also allow the liquid to enter into the piercing element. In this way, in some embodiments, under the dual pressure of the pressure in the sealed chamber and the penetration of the piercing element into the chamber 203 containing the treatment solution, the treatment solution can quickly enter into the chamber of the piercing element and mix with the fluid sample, the mixed solution can quickly flow out of the piercing element, for example, flow into the assay device through the channel of the connecting rod of the absorbing element, or into the chamber of the carrier.

Under the said dual pressure, due to high flow rate of the liquid, in some embodiments, a diversion element 113 is arranged at the liquid inlet of the carrier, on the one hand the diversion element serves to guide the liquid to the test strip; one the other, it functions to ease the impact of the liquid on the test strip, for example, if no diversion element is provided, the liquid passing through the liquid inlet will quickly flow in, and sometimes in a state similar to "jet", and splatter onto the test strip, thereby pre-wetting the testing element, or causing a "flooding" phenomenon, resulting in inaccurate test results. The useful liquid flows fast in the channel 12, a large amount of liquid will flow in a short period of time, if there is excess liquid, it can flow into the second area of the carrier to relieve the excessive flow of liquid on the testing element, thus to prevent a "flooding" phenomenon. It is understood that there are many ways to slow down the flow rate of the fluid through the liquid inlet 1117, or to relieve the excessive liquid flow onto the test strip, for example, arranging a small-hole mesh at the liquid inlet, or extending the liquid inlet or bending or folding the draining channel 1115, so as to slow down the flow rate, and thus to reduce the possible negative influence of the liquid on the testing.

In some embodiments, at this time, if the inner walls of the disc structure 805 with an absorbing element and the moving element 206 are sealed, the treatment solution or the treatment solution passing through the absorbing element can easily flow into the channel of the connecting rod 109 smoothly. At this time, it is allowed to compress the absorbing element continuously, as the inner walls of the disc structure 805 and the moving element 206 are sealed, compressing the absorbing element 107 will also increase the pressure of the sealed space with a solid structure, so that it is more conducive for the treatment solution passing the absorbing element to flow into the channel of the connecting rod, thus to make the liquid flow onto the test strip to complete the detection.

In some embodiments, when the piercing element moves downward (FIGS. 10-15), the air or gas in the sealed space 23 is compressed, and the pressure increases; when the piercing element pierces the sealed thin film, the treatment solution is forced to enter into the chamber of the piercing element and come into contact with the absorbing element arranged in the chamber, (at this time, the absorbing element may be compressed, or may not be compressed, or compressed to a certain degree, or not be fully compressed), thus to mix with the sample in the absorbing element, or mix with the liquid sample extruded out of the absorbing element, or elute the analyte on the absorbing element through the absorbing element, so as to quickly flow into a flow channel (the channel in the connecting rod, the guiding channel of the carrier, and the connecting rod and the connecting channel are in fluid connection), and quickly enter into the carrier and contact with the test strip. The moving speed of the piercing element and the compression degree of the sealed space can increase the pressure in the sealed space, so that the pressure forces the treatment solution and the fluid sample arranged in the piercing element, or the mixed solution formed by the treatment solution and the fluid sample can quickly flow onto the testing element. The increasing mode and the increasing speed of the pressure will affect the speed of a liquid flow onto the testing element. The faster the pressure increases, the faster the flow rate will be. There are many ways to form a sealed space, for example, arranging a seal ring 108 on the periphery of the piercing element, making the seal ring fit with the inner wall of the chamber of the receiving device to form a sealed space; or, making the piercing element closely contact the inner wall of the receiving device to form a sealed space. In this way, compression of the sealed space can not only speed up the liquid flow rate, but also prevent the liquid in the sealed space from leaking into the environment, thereby polluting the operator and the environment. Generally, the collector with an absorbing element is inserted vertically into the receiving device to make the liquid move upward against the gravity, compression of the sealed space will have a good effect on increasing the pressure.

In some embodiments, the absorbing element enters into the chamber of the piercing element, and the disc mechanism 805 for fixing the absorbing element also forms a sealed structure with the inner wall of the chamber of the piercing element, either the liquid sample extruded from the absorbing element or the treatment solution entering into the piercing element, will not flow to the outside of the piercing element, and cause pollution to the operator and the environment. Simultaneously, because the disc mechanism also forms a seal with the chamber of the piercing element, the absorbing element is further compressed; as the disc mechanism 805 and the inner wall of the piercing element 10 (i.e. the second chamber) are in a sealed state, compression of the absorbing element 107 may also increase the pressure of the space sealed by the fixing piece (the fixing piece also forms a sealed space in the chamber of the piercing element), so that it is more favorable for the treatment solution to flow into the channel of the connecting rod through the absorbing element, thus to complete the detection of the solution that flows onto the test strip; and at this time, the piercing element has entered into the treatment solution, and with the compression of the dual sealed space (the sealed space of the disc mechanism in the piercing element and the chamber formed by the piercing element and the receiving device), the pressure is doubled, and then the liquid sample or the mixed solution formed by the treatment solution and the liquid sample, or the treatment solution alone can flow into the fluid channel either through the absorbing element or not through the absorbing element, and quickly arrives at the test strip, thus to easily obtain the test result. Simultaneously, the treatment solution will not flow out of the receiving device, nor will it cause pollution to the environment or the operator; in fact, the channel 12 in the connecting rod 109 is in pressure communication with the outside, so that the pressure increase can only make the liquid be transported into the carrier through the channel 12, and there is no other ways of passing, hence, this is one of the most preferred embodiments of the present invention.

In some embodiments, for example, FIGS. 19-22 depict the operation process of the present invention, the specific assay device and receiving device described in this operation process are only a specific embodiment, which cannot limit the present invention.

As shown in FIG. 2 and FIG. 3, the present invention provides an assay device, comprising a carrier element 111, four grooves 1110, 1114, 11123, 11124 being arranged on the carrier element, and a lateral flow test strip 1128, 1129, 1130, 1131 being respectively arranged in the four grooves 1110, 1114, 11123, 11124, each of the test strip corresponding to a specific analyte. When arranging the test strip, the water absorbing element 1123 of the test strip is arranged at the end of the carrier element away from the guiding channel 1115, and the sample feeding area 1121 of the test strip is close to the end of the guiding channel 1115. Simultaneously, a part of the sample feeding area is “suspended” over the opening of the chamber 1116 of the carrier element 111 (see FIG. 4A). A dividing element is arranged in the chamber 1116, and the dividing element divides the chamber 1116 into two parts; the specific embodiment is described as below: a baffle 1119 is arranged, and the height of the baffle is less than the depth of the chamber 1116, the baffle is arranged in front of the inlet 1117 of the guiding channel 1115, thus to form a narrow gap between the inlet and the baffle, one end 1131 of the guiding element is inserted into the narrow gap, which almost blocks or covers the inlet 1117. Then, the other end 1133 of the guiding element is folded, the fold line position 1132 is made in contact with the end of the sample feeding area of the test strip, and the folded end 1133 covers the sample feeding area (see FIG. 18). Then the front of the carrier is covered with a layer of transparent single-sided adhesive thin film and make the thin film seal the entire groove and the chamber opening, thus, to form a relatively sealed space. A channel 1118 is arranged on both sides of the opening of the chamber 1116, so as to form a ventilation channel communicating with the outside with the thin film 114. The carrier is inserted into the chamber of the receiving element 110 the front side of the carrier (the side covering the thin film) faces the upper surface 1102 of the chamber of the receiving element, and the receiving chamber is also made of a transparent plastic material.

The present invention further provides a collector, the collector comprises an absorbing element 107 and a connecting rod 109, wherein a disk 805 is provided at one end of the connecting rod, the absorbing element 107 is bonded to the disk 805 by glue and an elastic seal ring 108 is arranged on the disk, a transmission channel 12 is arranged in the connecting rod, one end of which is in fluid communication with the absorbing element 107, and the other end thereof is connected with the guiding channel 1115 on the carrier, thus to achieve fluid communication. The absorbing element is made of a sponge material, and the absorbing element is rigid when dry and soft when wet, and it is squeezed or compressed. The other end of the connecting rod 109 has a thread 1093, and the guiding channel 1115 has an internal thread. The receiving element 111 comprises a connecting element 1101, and an external thread 1105 is arranged on the outer wall of the connecting element. An opening is arranged on the connecting element, and the diameter of the opening is consistent with the opening diameter of the second chamber of the piercing element, so as to facilitate the opening of the connecting element to contact the opening of the second chamber of the piercing element, thus to conveniently push the piercing element to move. Annular bulges 1191, 1192 are arranged on the connecting rod, and the bulges can basically be in contact with the inner wall of the connecting element. In this way, the threaded end of the connecting rod 109 passes through the connecting element 1101 and the hole 11011 in front of the receiving chamber, and through the inner wall of the connecting element and the annular bulges on the connecting rod 109, the thread 1193 of the connecting rod is directly connected to the open thread at one end of the guiding channel 1115, thus to form a fluid communication. Thus, the assay device in a specific embodiment of the present invention is formed, as shown in the cross-sectional structure diagram of FIG. 19.

The following steps are to be followed when assembling the assay device: first assemble the carrier with a testing element, then insert the carrier into the chamber of the accommodating element, provide a collector with an absorbing element, make the collector sterilized by radiation, and then assemble it with the carrier through the accommodating element.

Figure 17:
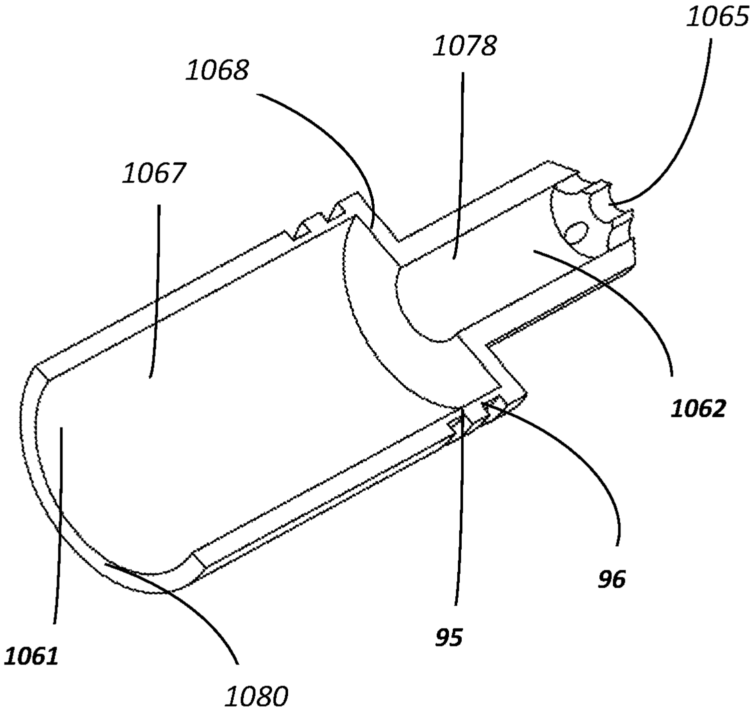
FIG. 17 depicts a section structure diagram of a piercing element according to a specific embodiment of the present invention.

In a specific embodiment of the present invention, a receiving device is provided, the device is of a chamber structure which is divided into three parts, a first chamber 91, a second chamber 94 and a third chamber 90, wherein a sealed chamber 103 is arranged in the first chamber, the sealed chamber contains a treatment solution 1038, the sealed chamber is sealed by a sealed thin film 104, but actually sealed by an aluminum foil. The second chamber and the third chamber of the receiving device comprises a piercing element, and the piercing element comprises a first chamber 1062 and a second chamber 1061, and the specific structure is shown in FIG. 16 and FIG. 17. At the connection between the first chamber and the second chamber of the piercing element, two grooves 95, 96 are arranged at the end of the second chamber, and an elastic seal ring 105 (FIG. 17) is respectively arranged in the grooves, and the elastic seal contacts the inner wall of the second chamber to form a sealed space 80 under the contact of the elastic seal ring of the second chamber, and the space includes the second chamber and the first chamber of the receiving device. The inner wall of the third chamber of the receiving device has a concave thread, and the structure of the concave thread fits with a convex thread structure on the surface of the connecting element. The second chamber of the piercing element is arranged in the third chamber of the receiving device, and a distance for a space is reserved between the outer wall of the second chamber of the piercing element and the inner wall of the third chamber of the receiving device, so as to provide convenience for fitting the convex thread on the outer surface of the connecting element with the concave thread on the inner surface of the second chamber, thereby driving the movement of the piercing element, the initial position of the piercing element in the receiving device is shown in the lower part of FIG. 19.

In the specific use, first extend the absorbing element of the assay device, for example the sponge head, into the mouth to suck a saliva sample, the sponge head becomes soft after absorbing the saliva sample, after the saliva sample is absorbed, insert the absorbing element into the second chamber 1061 of the piercing element, as the collector has a seal ring 108, when the saliva is absorbed in the second chamber of the piercing element, the softened absorbing element come into contact with the step 1068 of the piercing element, thereby extruding the saliva sample into the first chamber; at this time, the elastic sealing ring seals the second chamber of the piercing element, and the opening edge 1108 of the connecting element 1101 of the accommodating element contacts the edge 1070 of the second chamber opening of the piercing element, so that the piercing element is at the initial position (see FIG. 20), and the absorbing element is compressed to release the saliva sample into the first chamber 1062 of the piercing element. As the thread 1105 on the outer wall of the connecting element fits with the thread of the third chamber 90 of the receiving device, the connecting element 1101 pushes the piercing element to move downward from the initial position, at this time, the volume of the sealed space 80 of the elastic seal rings 1051, 1052 on the piercing element gradually becomes smaller, and the pressure in the space increases; and, the absorbing element is squeezed, and the positions of the piercing element and the absorbing element are relatively fixed, therefore, the absorbing element and the piercing element can move together during the movement. With the movement of the piercing element, the piercing element mechanism 1066 on the outer surface of the end of the first chamber 1062 of the piercing element contacts the sealing thin film 104 of the sealed chamber 103, and the piercing structure is generally a relatively sharp structure. After piercing the sealing thin film 104 of the sealed chamber 103, the first chamber of the piercing element continues to move downward, and partly enters into the chamber 103, with the compression of the sealed space, the pressure increases, including the pressure on the liquid applied after the first chamber enters into the sealed chamber 103. It is understood that, actually, the connecting rod of the absorbing element is in fluid communication with the chamber 1116 on the carrier 110, and the gas is also communicated, and the chamber 1116 is in communication with the outside through the arranged air holes 1103, therefore, the two chambers of the piercing element (first and second chambers) are actually indirectly communicated to the outside through the absorbing element. Therefore, compression of the sealed space and the pressure of the droplets caused by the first chamber of the piercing element entering into the sealed chamber 103 are combined, so that there is a pressure difference in the chamber of the piercing element and the sealed space 80 of the receiving element, in this way, the treatment solution in the sealed chamber 103 is forced to enter into the first chamber through the small hole 1065 of the first chamber and mix with the saliva sample to form a first mixed solution, as the pressure of the sealed chamber 80 keeps increasing, the first mixed solution passes through the second mixed solution formed by the compressed absorbing element 107, and then passes through the absorbing element for eluting, for example, eluting the THC adsorbed by the absorbing element, and enters into the channel 12 of the connecting rod, and flows into the chamber 1116 on the carrier through the guiding channel 1115 on the carrier, and simultaneously contacting the diversion element 113, then the second mixed solution flows into the testing element 112 for testing and assaying of an analyte (FIG. 22), if there is excess second mixed solution, then, the process that the solution enters into the second area in the chamber 1116 on the carrier can relieved. After the testing is completed, the result is read in the test area and the control area on the testing element through the transparent thin film on the carrier, the latter records the test results by photographing or by scanning.

In some embodiments, because the absorbing element becomes soft after absorbing the liquid (normally made of porous absorbent materials, such as sponge, filter paper, cotton, etc.), but after being compressed, the texture becomes tight, which allows the liquid to enter into the channel 12 through the absorbing element, the increased pressure in the sealed chamber 80 makes it easier and faster for the mixed solution to pass through the tight absorbing element, or otherwise, it may not be easy to pass.

In some other embodiments, the absorbing element may not be compressed, for example, the absorbing element is of a bar body with stool sample, and some concave threads or grooves are arranged on the bar body and used for taking a solid or semi-solid sample, the bar body is in fluid communication with the channel 12 in the connecting rod; after the above operations, the treatment solution entering into the chamber of the piercing element from the sealed chamber 103 dissolves the stool sample in the groove on the bar body, and flows onto the testing element through the channel 12 in the connecting rod.

It is understood that the second chamber of the receiving device may not be sealed, and only the first chamber 1062 of the piercing element enters into the sealing chamber 103, so that it is also feasible for the treatment solution to enter into the first chamber of the piercing element. The present invention also includes the following embodiments.

1. A receiving device, comprising a chamber and the chamber comprises a first sealed chamber that is configured to accommodate a treatment solution and a piercing element that is movable in the chamber, wherein the piercing element is configured to pierce the first sealed chamber.

2. A device according to clause 1, wherein the piercing element has a first position and a second position in the chamber.

3. A device according to clause 2, wherein the piercing element comprises a chamber and a piercing structure, the said piercing structure is configured to pierce the said first sealed chamber so that the treatment solution enters into the chamber of the said piercing element when the piercing element moves from the first position to the second position.

4. A device according to clause 2, wherein when the piercing element is at the first position, the said piercing element is away from the said sealed chamber.

5. A device according to clause 4, wherein when the piercing element is at the second position, a partial chamber of the piercing element enters into the sealed chamber to force the treatment solution to enter into the chamber of the piercing element;

6. A device according to clause 5, wherein the said piercing element comprises a through-hole, the said treatment solution flows into the said chamber through the through-hole.

7. A device of according to clause 3 or clause 5, wherein the chamber of the said piercing element is configured to receive a fluid sample, when a treatment solution enters into the chamber of the piercing element, the said treatment solution and the pierced fluid sample can form a first mixed solution.

8. A device according to clause 7, wherein the chamber of the piercing element is configured to receive an absorbing element, and the absorbing element is compressed or squeezed to release the said fluid sample.

9. A device according to clause 2, wherein the said piercing element comprises a first chamber and a second chamber that is configured to receive an absorbing element, the first chamber comprises a piercing structure.

10. A device according to clause 9, wherein when the said piercing element is at the first position, the said piercing structure does not pierce the said first sealed chamber; when the said piercing element is at the second position, the said piercing structure pierces the said first sealed chamber.

11. A device according to clause 10, wherein when the piercing element is at a second position, a partial first chamber of the piercing element enters into the said first sealed chamber, so as to force a treatment solution to enter into the first chamber of the said piercing element.

12. A device according to clause 10, wherein when the said piercing element is at the first position, the said absorbing element is compressed or squeezed to release a fluid sample to the first chamber of the piercing element, and the fluid sample can form a first mixed solution with the treatment solution in the first chamber.

13. A device according to clause 12, wherein when the piercing element is at a second position, the said first mixed solution passes through the absorbing element, thus to form a second mixed solution.

14. A device according to clause 13, wherein the said absorbing element is communicated with a channel fluid in a connecting rod, and the said second mixed solution formed by passing through the absorbing element flows into the channel of the connecting rod.

15. A device according to clause 1, wherein the piercing element has a sealed space that is compressed in the chamber of the receiving device, and the sealed space comprises the said first sealed chamber.

16. A device according to clause 15, wherein the chamber of the said receiving device comprises a second chamber, the said partial piercing element is arranged in the second chamber, and the partial sealed space that is compressed is arranged in the second chamber.

17. A device according to clause 16, wherein the said piercing element has a first position and a second position in the second chamber of the receiving device.

18. A device according to clause 17, wherein the said piercing element comprises a first chamber and a second chamber that is configured to receive an absorbing element, and the first chamber comprises a piercing structure and a through-hole.

19. A device according to clause 18, wherein when the said piercing element is at the first position, the said piercing structure does not pierce the said first sealed chamber; when the said piercing element is at the second position, the said piercing structure pierces the said first sealed chamber.

20. A device according to clause 19, wherein when the said piercing element is at the second position, the said sealed space is compressed to increase the pressure in the sealed space, so that the treatment solution in the first sealed chamber is forced to enter into the first chamber of the said piercing element through the said through-hole.

21. A device according to clause 20, wherein when the said piercing element is at the first position, the said absorbing element is compressed or squeezed to release a fluid sample to the first chamber of the piercing element, and the fluid sample can form a first mixed solution with the treatment solution in the first chamber.

22. A device according to clause 21, wherein when the piercing element is at the second position, the increased pressure in the said sealed space forces the first mixed solution to pass through the said absorbing element, thus to form a second mixed solution.

23. A device according to clause 22, wherein the said absorbing element is communicated with a channel fluid in a connecting rod, and the said second mixed solution formed by passing through the absorbing element is forced by the increased pressure in the sealed space to flow into the channel of the connecting rod.

24. A device according to clause 23, wherein the channel of the connecting rod is in fluid communication with the testing element, the said second mixed solution flows onto the testing element so that it detects presence of the analyte or quantity of the analyte.

25. A device according to clause 19, wherein when the piercing element is at a second position, a partial first chamber of the piercing element enters into the said first sealed chamber, so as to force a treatment solution to enter into the first chamber of the said piercing element.

26. A device according to clause 15, wherein when the piercing element is at a second position, the movement of the piercing element makes the sealed space compressed, thus to increase the pressure in the sealed space.

27. A device according to clause 26, wherein the movement of the piercing element makes the piercing structure of the piercing element pierce the said sealed first chamber, so that the increased pressure in the sealed space forces the treatment solution in the first sealed chamber to flow into the chamber of the piercing element.

28. A device according to clause 1, wherein the said first sealed chamber comprises a thin film that is pierced through.

29. A device to detect the presence of an analyte in a test fluid sample, comprising:

a carrier element, the carrier element comprising a testing element and a chamber and the said chamber comprising a fluid guiding channel, the said chamber being communicated with the testing element, and the testing element comprising a sample feeding area and a testing area.

30. A device according to clause 29, wherein the said device further comprises a diversion element, a fluid of the diversion element is communicated with the guiding channel and the testing element.

31. A device according to clause 30, wherein the said guiding channel comprises a fluid inlet and the fluid inlet is communicated with the fluid in the said chamber; the said chamber comprises a dividing element, the dividing element divides the chamber into a first area and a second area, and the said first area is arranged between the dividing element and the fluid inlet.

32. A device according to clause 31, wherein one end of the said diversion element is arranged at the first area, and the other end thereof covers a part of the sample feeding area.

33. A device according to clause 32, wherein the said second area is configured to receive a fluid sample.

34. A device according to clause 32, wherein one end of the said diversion element covers the said fluid inlet.

35. A device according to clause 29, wherein the said device comprises a collector, and the said collector comprises an absorbing element and a connecting rod.

36. A device according to clause 35, wherein the said collector and the carrier are detachably connected with each other.

37. A device according to clause 36, wherein the said device further comprises an accommodating element, the accommodating element comprises an accommodating chamber, and the said carrier element is arranged in the accommodating chamber.

38. A device according to clause 37, wherein the said carrier element is configured to be inserted in the accommodating chamber in only one direction.

39. A device according to clause 37, wherein the said accommodating chamber further comprises a connecting element, the connecting rod of the collector is connected to the guiding channel of the carrier through the connecting element.

40. A device according to clause 39, wherein the said connecting element further comprises a thread structure.

41. A device according to clause 29, wherein the chamber on the said carrier comprises a vent hole communicated to the outside atmosphere.

The present invention provides an assay system, comprising an assay device mentioned in clauses 29-41 and a receiving device mentioned in clauses 1-28.

The present disclosure further includes the following embodiments.

1. A method of treating a fluid sample, the method includes: providing a device, the device comprising a first sealed chamber for accommodating a treatment solution and a piercing element that is movable in the device, the piercing element moves so that the sealed chamber containing the treatment solution is pierced, thus to the treatment solution.

2. The method according to clause 1, wherein the piercing element comprises a chamber, which allows the released treatment solution to enter into the chamber of the piercing element.

3. The method according to clause 1, wherein the absorbing element is introduced into the chamber of the piercing element to contact with the treatment solution, thereby forming a mixed solution of the treatment solution and the fluid sample.

4. The method according to clause 3, wherein the absorbing element is squeezed in the chamber of the piercing element to release a fluid sample, and the fluid sample is mixed with the treatment solution in the chamber to form the said first mixed solution.

5. The method according to clause 4, the formed first mixed solution is returned to the absorbing element to contact with the absorbing element, thus to form a second mixed solution and the second mixed solution is allowed to flow out of the piercing element.

6. A method according to clause 4, the second mixed solution flowing out of the piercing element is guided to flow into the testing element for testing or assaying of an analyte.

7. A method according to clause 1, the device further comprises a second chamber for accommodating the partial piercing element; wherein, the piercing element has a first position and a second position in the second chamber.

8. A method according to clause 7, the piercing element moves from the first position to the second position, so that the piercing structure on the piercing element pierces the first chamber accommodating the treatment solution and the treatment solution in the first chamber enters into the chamber of the piercing element.

9. A method according to clause 8, a partial chamber of the piercing element is allowed to enter into the first chamber containing the treatment solution.

10. A method according to clause 8, the piercing element comprises a first chamber containing a piercing structure and a second chamber for receiving the absorbing element, when the first chamber of the piercing element enters into the first chamber containing the treatment solution, the treatment solution is forced to enter into the first chamber of the piercing element.

11. A method according to clause 10, the second chamber of the piercing element receives the absorbing element and compresses the absorbing element to release a fluid sample, and the released fluid sample enters into the first chamber of the piercing element and mixes with the treatment solution to form a first mixed solution.

12. A method according to clause 10, the mixed solution enters into the second chamber of the piercing element to contact with the absorbing element or pass through the absorbing element to form a second mixed solution, and the second mixed solution flows out of the piercing element and enters into the testing element.

13. A method according to clause 7, the absorbing element is inserted into the chamber of the piercing element, thus to compress the absorbing element, and simultaneously the piercing element is pushed from the first position to the second position.

14. A method according to clause 8, the absorbing element is inserted into the second chamber of the piercing element and the absorbing element is compressed to release a fluid sample, and the released fluid sample flows into the first chamber of the piercing element.

15. A method according to clause 8, the absorbing element pushes the piercing element to move from the first position to the second position, so that the piercing element pierces the first chamber containing the treatment solution, and allows the first chamber of the piercing element to enter into the chamber containing the treatment solution, so that the treatment solution is forced into the first chamber of the piercing element and mixed with the fluid sample.

16. A method according to clause 13, the absorbing element is connected to a connecting rod, and a channel is arranged in the connecting rod and is in fluid communication with the absorbing element.

17. A method according to clause 13, the piercing element forms a sealed space in a sealing device, the sealed space is compressed to increase the pressure in the space, the said sealed space comprises the said first sealed chamber containing a treatment solution.

18. A method according to clause 17, the absorbing element with a connecting rod is inserted into the second chamber of the piercing element, and the second chamber is sealed, the absorbing element is compressed in the second chamber, and simultaneously, the piercing element is pushed to move from the first position to the second position 19. A method according to clause 17, the sealed space of the device is compressed, so as to increase the pressure; with the first chamber of the piercing element enters into the chamber containing the treatment solution, the increased pressure forces the treatment solution to enter into the first chamber and mix with the fluid sample.

20. A method according to clause 19, the increased pressure makes the mixed solution flow into the second chamber of the puncture element and pass through the absorbing element into the channel of the connecting rod, thereby finally flowing on the testing element.

30. A device for detecting a presence of an analyte in a fluid sample, comprising:

a carrier element; the carrier element comprising a testing element and a chamber; and the chamber comprising a fluid guiding channel, the chamber being in fluid communication with the testing element, and the testing element comprising a sample feeding area and a testing area.

31. The device of clause 30, wherein the device further comprises a diversion element, the diversion element is in fluid communication with the guiding channel and the testing element.

32. The device of clause 31, wherein the guiding channel comprises a fluid inlet and the fluid inlet is in fluid communication with the chamber; the chamber comprises a dividing element, the dividing element divides the chamber into a first area and a second area, and the first area is arranged between the dividing element and the fluid inlet.

33. The device of clause 32, wherein one end of the diversion element is arranged at the first area, and the other end thereof covers a part of the sample feeding area.

34. The device of clause 32, wherein the second area is configured to receive a fluid sample or configured to receive excessive fluid sample flowing to the outside of the diversion element.

35. The device of clause 33, wherein one end of the diversion element covers the fluid inlet, or a part of the diversion element in the first area covers the fluid inlet.

36. The device of clause 30, wherein the device comprises a collector, and the collector comprises an absorbing element and a connecting rod.

37. The device of clause 36, wherein the collector and the carrier are detachably connected with each other.

38. The device of clause 30, wherein the device further comprises an accommodating element, the accommodating element comprises an accommodating chamber, and the carrier element is arranged in the accommodating chamber.

39. The device of clause 38, wherein the carrier element is configured to be inserted in the accommodating chamber in only one direction.

40. The device of clause 38, wherein the accommodating chamber further comprises a connecting element, the connecting rod of the collector is detachably connected to the guiding channel of the carrier through the connecting element.

41. The device of clause 40, wherein the connecting element further comprises a thread structure.

42. The device of clause 30, wherein the chamber on the carrier comprises a vent hole communicated to the outside atmosphere.

43. The device of clause 30, wherein the testing element and the chamber are covered by a transparent thin film.

44. The device of clause 30, wherein said fluid sample is a saliva.

All patents and publications mentioned in the specification of the invention indicate that these are public technologies in the field, which is used by the invention. All patents and publications quoted herein are also listed in the references, as each publication is specifically referenced separately. The invention described herein may be implemented in the absence of any one or more elements, one or more restrictions, which are not specially specified herein. For example, the terms "including", "comprising" and "consisting of" in each embodiment is replaced by the other two. The so-called "one" herein only means "one", while excluding or only does not mean only including one, it also means including more than two. The terms and expressions used here are described without limitation, and it is not intended herein to indicate that the terms and interpretations described in this document exclude any equivalent feature, but it is understood that any appropriate alteration or modification may be made to the extent of the invention and claims. It is understood that the embodiments described in the present invention are some preferred exemplary embodiments and features. Any person skilled in the art makes some variations and changes based on the essence described in the present invention. These variations and changes are also considered within the scope of the invention and the scope limited by the independent claims and the dependent claims.

The invention claimed is:

1. A combination comprising:

a detection device having at least one detection element capable of indicating presence of an analyte;

a collecting device having a fluid passage and an absorbing element in fluid communication with the fluid passage, the collecting device being detachably connectable to the detection device such that the fluid passage will be in fluid communication with the detection device;

a receiving device including:

a receiving cup engageable with the detection device, the receiving cup defining:

a first chamber in which a treatment solution is contained by a pierceable material;

a second chamber adjacent to the first chamber but being separated therefrom by the pierceable material, the second chamber having a smooth inner surface; and wherein the receiving cup further defines a third chamber opposite to the first chamber, the third chamber having internal threads engageable with external threads of the detection device; and a piercing element slidably movable in the receiving cup, the piercing element having a first tube portion and an axially-aligned second portion, the second portion carrying a piercing structure at a distal end thereof, the piercing structure defining at least one through hole, wherein the absorbing element is receivable in the first tube portion of the piercing element and an outer surface of the first tube portion is in sealing engagement with the smooth inner surface of the second chamber of the receiving cup via at least one seal, wherein rotation of the receiving cup causes the absorbing element to push the piercing element whereby the pierceable material will be ruptured to release the treatment solution.

2. The combination as set forth in claim 1, wherein movement of the piercing element reduces a sealed space defined between the at least one seal and the pierceable material.

3. The combination as set forth in claim 1, wherein the absorbing element is in the form of a cylindrical sponge.

4. The combination as set forth in claim 3, wherein the collecting device is sealingly engageable with an inner surface of the first tube portion via at least one seal so that the absorbing element will be located in a sealed space.

5. The combination as set forth in claim 1, wherein the detection device has a cylindrical guiding channel at which the collecting device is detachably connected.

6. The combination as set forth in claim 5, wherein the collecting device has an elongate connecting rod defining the fluid passage which is connectable to the guiding channel at one end, the absorbing element being located at an opposite end of the connecting rod.

7. The combination as set forth in claim 6, wherein the connecting rod has a disc-shaped expanded portion to which the absorbing element is attached.

8. The combination as set forth in claim 7, further comprising at least one seal located on the expanded portion such that the connecting rod is sealingly engageable with an inner surface of the first tube portion.

9. The combination as set forth in claim 5, wherein the detection device defines a recessed area adjacent the guiding channel, the recessed area forming a chamber to receive excess liquid from the collecting device.

10. The combination as set forth in claim 1, wherein the at least one detection element of the detection device comprises at least one test strip.

* * * * *